(12) United States Patent
Jitaru

(10) Patent No.: US 11,218,078 B2
(45) Date of Patent: *Jan. 4, 2022

(54) HIGH EFFICIENCY PASSIVE CLAMP

(71) Applicant: Rompower Technology Holdings, LLC, Milford, DE (US)

(72) Inventor: Ionel Jitaru, Tucson, AZ (US)

(73) Assignee: Rompower Technology Holdings, LLC, Milford, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,512

(22) Filed: Apr. 5, 2021

(65) Prior Publication Data

US 2021/0226549 A1   Jul. 22, 2021

Related U.S. Application Data

(60) Division of application No. 16/775,967, filed on Jan. 29, 2020, now Pat. No. 10,972,014, which is a continuation-in-part of application No. 16/503,432, filed on Jul. 3, 2019, now Pat. No. 10,574,148, and a continuation-in-part of application No. 16/158,202, filed on Oct. 11, 2018, now Pat. No. 10,651,748.

(60) Provisional application No. 62/841,694, filed on May 1, 2019, provisional application No. 62/571,594, filed on Oct. 12, 2017.

(51) Int. Cl.
*H02M 1/34* (2007.01)
*H02M 3/335* (2006.01)
*H02M 1/00* (2006.01)

(52) U.S. Cl.
CPC ...... *H02M 3/33592* (2013.01); *H02M 1/0006* (2021.05); *H02M 1/34* (2013.01); *H02M 1/342* (2021.05); *H02M 1/346* (2021.05); *H02M 1/348* (2021.05)

(58) Field of Classification Search
CPC ............. H02M 2001/348; H02M 1/34; H02M 2001/346; H02M 3/33592; H02M 3/33569; H02M 2001/342; H02M 2001/344
See application file for complete search history.

(56) References Cited

U.S. PATENT DOCUMENTS

| 10,972,014 B2 * | 4/2021 | Jitaru | H02M 3/33507 |
| 2011/0057639 A1 * | 3/2011 | Chung | H02M 1/34 |
| | | | 323/311 |

(Continued)

*Primary Examiner* — Harry R Behm
(74) *Attorney, Agent, or Firm* — Thomas W. Galvani, P.C.; Thomas W. Galvani

(57) ABSTRACT

A DC-DC converter includes an input voltage source in series with a parasitic capacitance. The voltage changes and causes resonant ringing, wherein the input voltage source is connected to a rectifier means which is connected to an output circuit. A passive clamp circuit across the rectifier means includes a clamp diode, a clamp capacitor, and an auxiliary circuit. The auxiliary circuit includes first and second rectifiers in series with an electronic component having first and second terminals. The first rectifier has an anode connected with the passive clamp circuit, and a cathode connected to the second terminal of the electronic component. The second rectifier has a cathode connected with the anode of the first rectifier, and an anode connected with the first terminal of the electronic component. Some of the leakage inductance transfers to an auxiliary energy storage and damps the resonant ringing.

3 Claims, 32 Drawing Sheets

(56) References Cited

U.S. PATENT DOCUMENTS

2014/0313627 A1* 10/2014 Li .................... H02M 1/34
  361/91.5
2015/0303789 A1* 10/2015 Feng ................ H02M 7/487
  307/43

* cited by examiner

A.) $Zc = \sqrt{\dfrac{L_m}{C_{eq}}}$

B.) $\omega = \dfrac{1}{\sqrt{L_m * C_{eq}}}$

C.) $\theta = \arctan(Zc * \dfrac{I_m}{V_r - V_{in}})$

D.) $V_{SW}(t) = V_r - (V_r - V_{in})\dfrac{\cos\theta - \cos(\theta - \omega t)}{\cos\theta}$ E.) $I_{Lm}(t) = (V_r - V_{in})\dfrac{\sin(\theta - \omega t)}{Zc * \cos\theta}$ F.) $E = \dfrac{1}{2}C_{eq}V_r^2 + \dfrac{1}{2}L_m I_m^2$

Fig. 4B

Trr: reverse recovery time
ta: the first portion of the recovery time
tb: the secondary portion of the recovery time
Irrm: peak reverse current
Qrr: the total reverse recovery charge
dIf/dt: negative current slope
di(rec)/dt: characterizes the softness High Line – 230V Low Line – 115V

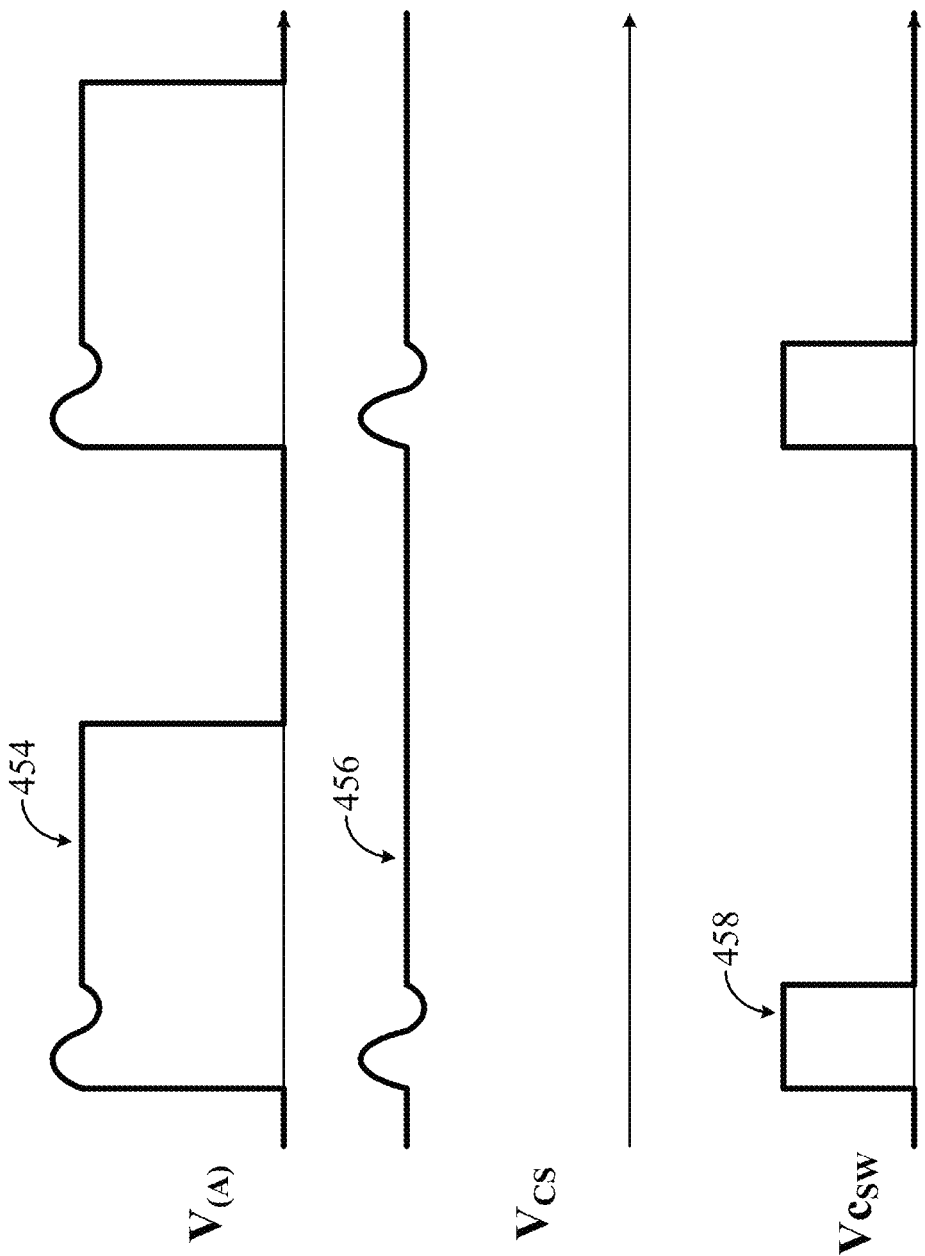

HIGH EFFICIENCY PASSIVE CLAMP

CROSS-REFERENCE TO RELATED APPLICATIONS

This application is a division of U.S. patent application Ser. No. 16/775,967, filed Jan. 29, 2020, which is a continuation-in-part of and claims the benefit of prior U.S. patent application Ser. No. 16/158,202, filed Oct. 11, 2018, which claims the benefit of U.S. Provisional Application No. 62/571,594, filed Oct. 12, 2017; this application is a continuation-in-part of and claims the benefit of prior U.S. patent application Ser. No. 16/503,432, filed Jul. 3, 2019; and this application claims the benefit of U.S. Provisional Application No. 62/841,694, filed May 1, 2019. All of the foregoing applications are hereby incorporated by reference. The disclosure of International Application No. PCT/US2018/61333 is also hereby incorporated by reference.

FIELD

The present invention relates generally to electronic devices, and more particularly to power converters.

BACKGROUND

Flyback topology is, arguably, one of the most used circuit topologies in the field of power conversion, especially in lower-to-medium power applications (such as AC-DC adapters, for example). The reason for such a high level of adoption of flyback topology is its simplicity and low cost of implementation, as well as the fact that the so-configured electrical circuitry can operate efficiently over a very large range of input voltages. In AC-DC adapter applications with powers under about 70 W, in order to gain a capability to nearly universal applications, the circuits formatted according to flyback topology are used to operate after an output from a simple bridge rectifier, while the alternating-current input voltage ranges from 90 Vac to 264 Vac (conventionally, a rectifier is an electrical device that converts alternating current to direct current, which flows in only one direction).

To meet all the AC-voltage standards for different countries, when placed at the output of the rectifier, the flyback converter has to be able to operate efficiently with a DC input voltage ranging from 127 Vdc to 375 Vdc, which is a range in which the ratio of the upper input voltage limit to the lower voltage limit is almost three to one. Additionally, the new standards for power delivery require that the adapters provide a voltage output ranging from 5V to 20V (with the ratio of the upper voltage limit to the lower voltage limit of four to one, as far as the output voltage is concerned). Most of the forward-derived topologies (such as, for example, half-bridge topology, two-transistor forward topology, full bridge topology, and others) are not able to operate efficiently over such large input and output voltage ranges provided by the transfer function of the flyback topology based circuit.

The trend for miniaturization of portable equipment (for example, portable computing devices such as laptops and tablets) extends this demand even further, such that AC-DC adapters have also become subject to these requirements. Presently, most laptops and tablets require, for operation, power ranging from 30 W to 65 W. Due to the significant technological advancement in portable computing devices, the size of laptops and tablets has been significantly reduced, and yet the AC-DC adapters used to power such devices remain quite large (for example, dimensions of a typical adaptor for a small tablet device are about 3.3" by 1.8" by 1.3" or so). This has created pressures for size reduction of AC-DC adapters. An ability to reduce the size of the required adapters while maintaining the convection-based cooling methodology used today requires some significant improvement in efficiency of the adapters as well as a decrease of size of the magnetic and capacitive storage elements.

Over the years, the efficiency of the AC-DC adapters has been increased from about 70% to about 89-90% (in recent products such as the Apple 30 W adapter, for example). This has been mostly due to the significant progress in semiconductor industry and a better understanding of magnetic technology. The flyback topology, however, possesses several drawbacks that limit its efficiency of operation. In most applications, the flyback-topology circuitry operates in a discontinuous mode. In a discontinuous mode of operation, the magnetizing current is first built up from zero to a peak conducting, and after the main switch turns off, the magnetizing current flows into the secondary side winding and transfers the energy to the output capacitor until the value of the magnetizing current decreases to zero. This portion of the operation cycle is followed by a second period of time, referred as "dead time", when no energy is stored in the transformer or transferred to the secondary. When the "dead time" is reduced to the transition time (which is the time interval during which the voltage across the main switch decays from the level it had when the magnetizing current flowed into the secondary winding to its lowest level, which occurs in the beginning of the "dead time"), this mode of operation is referred as a critical conduction mode of operation.

SUMMARY

In an embodiment, a circuit has primary and secondary sides and includes a flyback power converter including an input voltage source and a transformer having primary and secondary windings on the primary and secondary sides, respectively. A main switch is in series with the primary winding on the primary side. A passive clamp circuit is across the main switch, the passive clamp circuit including a clamp diode, a clamp capacitor, and an auxiliary circuit having first and second rectifiers in series with each other and in series with an electronic component configured to store electromagnetic energy. The electronic component has first and second terminals. A cathode of the first rectifier is connected with the passive clamp circuit, and an anode of the first rectifier is connected to the second terminal of electronic component. An anode of the second rectifier is connected with the cathode of the first rectifier, and a cathode of the second rectifier is connected with the first terminal of the electronic component. In an embodiment, the auxiliary circuit is configured to reduce an RMS current through the clamp capacitor from a first current value to a second current value which is at least thirty percent lower than the first current value, and to reduce a charge through the clamp capacitor from a first charge value to a second charge value which is at least thirty percent lower than the first charge value. In an embodiment, the clamp diode is formed by several diodes in parallel. In an embodiment, the first rectifier is in series with a resistor. In an embodiment, the first rectifier is in series with a resistor. In an embodiment, the electronic component includes a voltage source, the first terminal is a positive terminal of the voltage source, and the second terminal is a negative terminal of the voltage source. In an embodiment, the electronic component includes a voltage source, and the voltage source provides a bias voltage to the flyback power converter. In an embodiment, the electronic component includes a bias voltage source for the flyback power converter having a bias winding in the transformer, the bias winding coupled with the primary winding of the transformer and having first and second terminals, a bias synchronous rectifier having a gate and a drain, wherein the drawn of the bias synchronous rectifier is connected to the first terminal of the bias winding, and a bias capacitor connected to the second terminal of the bias winding and to the source of the bias synchronous rectifier. In an embodiment, a resistor is connected between the positive terminal of the input voltage source and a junction between the clamp capacitor and clamp diode.

In another embodiment, a method of operating a circuit having primary and secondary sides includes providing a flyback power converter having an input voltage source and a transformer having primary and secondary windings on the primary and second sides, respectively. The method includes providing a main switch in series with the primary winding on the primary side, providing a synchronous rectifier in series with the secondary winding on the secondary side, providing a passive clamp circuit across the main switch, the passive clamp circuit including a clamp diode and a clamp capacitor in series with the clamp diode. The circuit is characterized by an electrical charge, injected into the clamp capacitor after the main switch is turned off, the electrical charge having a first charge value. The method further includes electrically connecting the circuit with an auxiliary circuit in series with the clamp capacitor, wherein the auxiliary circuit includes an auxiliary energy storage, first and second rectifiers in series with each other, and an electronic component configured to store electromagnetic energy in series with the first and second rectifiers. A cathode of the first rectifier is connected with the passive clamp circuit, and an anode of the first rectifier is connected to the second terminal of electronic component. An anode of the second rectifier is connected with the cathode of the first rectifier, and a cathode of the second rectifier is connected with the first terminal of the electronic component. The method further includes directing a current, flowing through a leakage inductance reflected in the primary side of the transformer, to flow through the clamp capacitor and through the second rectifier toward the auxiliary energy storage, so as to change the first charge value, thereby imparting a second charge value to flow through the first rectifier during a reverse recovery time of the clamp diode, so as to balance the electrical charge in the clamp capacitor. In an embodiment, the step of electrically connecting further includes connecting the auxiliary energy storage between a ground and the cathode of the second rectifier. In an embodiment, the step of electrically connecting further includes connecting the anode of the first rectifier to the ground via a resistor. In an embodiment, a resistor is connected between a positive terminal of the input voltage source and a junction between the clamp capacitor and clamp diode.

In yet another embodiment, a circuit having primary and secondary sides includes a flyback power converter including an input voltage source having positive and negative terminals, a transformer having primary and secondary windings on the primary and secondary sides, respectively. A main is in series with the primary winding on the primary side. A parasitic capacitor is across the main switch, and a synchronous rectifier is in series with the secondary winding on the secondary side. A passive clamp circuit is across the main switch, the passive clamp circuit includes a clamp diode, a clamp capacitor in series with the clamp diode, a resistor connected between the positive terminal of the input voltage source and a junction between the clamp capacitor and clamp diode. First and second rectifiers are in series with each other, and in series with an electronic component configured to store electromagnetic energy. A cathode of the first rectifier is connected with the passive clamp circuit, and an anode of the first rectifier is connected to a second terminal of electronic component. An anode of the second rectifier is connected with the cathode of the first rectifier, and a cathode of the second rectifier is connected with a first terminal of the electronic component. In an embodiment, a resistor is in series with the first rectifier. In an embodiment, a current injection circuit includes a current injection winding in the transformer having first and second terminals, a current injection switch is connected to the first terminal of the current injection winding. A current injection diode has a cathode connected to the second terminal of the current injection winding, and an anode connected to the electronic component configured to store electromagnetic energy. An energy source collects energy of a leakage inductance of the transformer via the passive clamp circuit and second rectifier. The current injection winding is configured to inject the energy as a pulse of current into the transformer via the current injection winding, so as to discharge the parasitic capacitor to create a zero voltage switching condition for the main switch. In an embodiment, a resonant capacitor is between the second terminal of the current injection winding and the current injection switch at a terminal of current injection switch which is not connected to the current injection winding. In an embodiment, the circuit includes a bias diode having an anode, connected to the second terminal of the electronic component, and a cathode, connected to a bias voltage. In an embodiment, the clamp diode includes at least two diodes in parallel. In an embodiment, the current injection switch turns on when a voltage across the main switch reaches its lowest amplitude, and the main switch turns on when the voltage across the main switch reaches a predetermined value. In an embodiment, the predetermined value is zero.

In still another embodiment, a circuit has primary and secondary sides and includes an input voltage source connected to a primary winding of a transformer, the transformer having additional windings, and a leakage inductance between the primary winding and the additional windings. The circuit further includes a main switch in series with the primary winding, wherein a magnetizing current of the transformer has a low impedance path to further circulate after the main switch turns off. The circuit includes a passive clamp circuit having of a diode and a capacitor in series, wherein the passive clamp circuit is connected to an energy extraction circuit having first and second rectifiers connected in series with each other and in series with an electronic component configured to store electromagnetic energy. The cathode of the first rectifier is connected with the passive clamp circuit, and an anode of the first rectifier is connected to a second terminal of electronic component. An anode of the second rectifier is connected with the cathode of the first rectifier, and a cathode of the second rectifier is connected with a first terminal of the electronic component. In an embodiment, the circuit includes a current injection winding in the transformer having first and second terminals, a current injection switch connected to the first terminal of the current injection winding, and a current injection diode, with a cathode connected to the second terminal of the current injection winding, and an anode connected to the electronic component configured to store electromagnetic energy. The circuit further includes an energy source to collect energy of a leakage inductance of the transformer via the passive clamp circuit and second rectifier. The current injection winding is configured to inject the energy as a pulse of current into the transformer via the current injection winding, so as to discharge the parasitic capacitor to create a zero voltage switching condition for the main switch. In an embodiment, the circuit further includes a resistor in series with the first rectifier. In an embodiment, the circuit further includes a resistor connected between a positive terminal of the input voltage source and a junction between the capacitor and diode.

In another embodiment, a DC-DC converter includes an input voltage source in series with a parasitic capacitance, wherein a voltage of the input voltage source changes sufficiently abruptly to cause resonant ringing, wherein the input voltage source is connected to a rectifier means which is connected to an output circuit. The converter includes a passive clamp circuit across the rectifier means, wherein the passive clamp circuit includes a clamp diode, a clamp capacitor, and an auxiliary circuit, said auxiliary circuit including first and second rectifiers in series with each other and in series with an electronic component configured to store electromagnetic energy, the electronic component having first and second terminals. A cathode of the first rectifier is connected with the passive clamp circuit, and an anode of the first rectifier is connected to the second terminal of the electronic component. An anode of the second rectifier is connected with the cathode of the first rectifier, and a cathode of the second rectifier is connected with the first terminal of the electronic component. Directing a current, flowing through a leakage inductance, to flow through the clamp capacitor and through the second rectifier toward the auxiliary energy storage, causes some of the leakage inductance to transfer to an auxiliary energy storage and damps the resonant ringing. In an embodiment, the anode of the first rectifier is connected to a ground via a resistor. In an embodiment, the electronic component includes a voltage source which provides a bias voltage to the DC-DC converter.

In short, this disclosure presents several electronic-circuitry configurations that address the limitations conventionally associated with flyback topology. The proposed solutions increase the efficiency of flyback-topology-utilizing power converters above about 94%, decrease the level of dissipated heat and, as a result, produce a much higher power density (for example, above 27 W/in¬3).

The above provides the reader with a very brief summary of some embodiments described below. Simplifications and omissions are made, and the summary is not intended to limit or define in any way the scope of the invention or key aspects thereof. Rather, this brief summary merely introduces the reader to some aspects of some embodiments in preparation for the detailed description that follows.

BRIEF DESCRIPTION OF THE DRAWINGS

Referring to the drawings:

FIG. 4B illustrates equations characterizing behavior of the resonant circuit of FIG. 4A;
FIG. 25B illustrates voltages in elements of the RC snubber of FIG. 25A.

DETAILED DESCRIPTION

Figure 1:
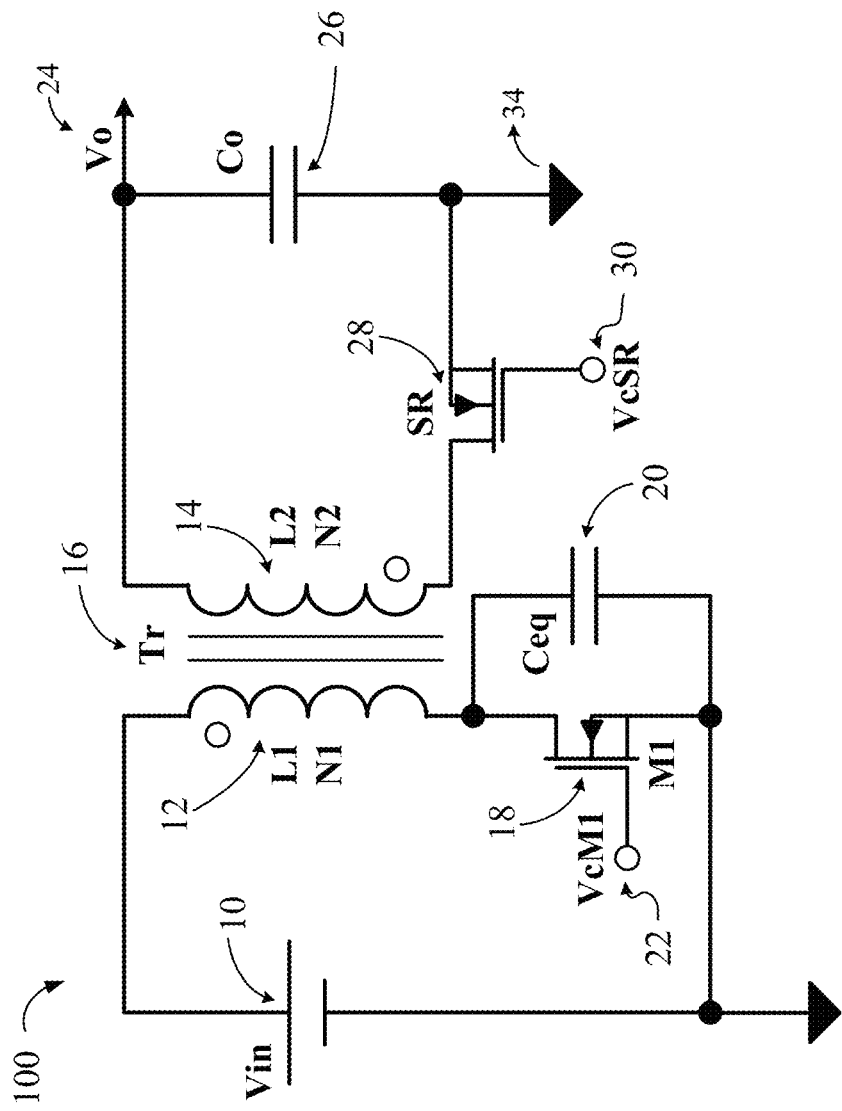
FIG. 1 is a schematic of a prior art power converter.

Reference now is made to the drawings, in which the same reference characters are used throughout the different figures to designate the same elements. Use of various flyback topology-based circuits in power conversion devices is conventionally associated with ringing, in various waveforms characterizing the operation of a given power conversion device, caused by the energy of leakage inductance, which energy remains substantially lost. Embodiments presented herein address this problem of wasting such electromagnetic energy by devising subtle modifications of flyback topology-based circuits that not only reduce such circulation but also optionally redirect this energy to be re-used for other purposes.

FIG. 1 illustrates a simplified schematic of electronic circuitry of a prior art power converter 100 configured according to a flyback topology using a passive clamp. The flyback converter 100 is formed by a transformer (Tr, 16) that has a primary winding 12 (with corresponding inductance L1 and N1 turns in the corresponding coil) on the primary side, and a secondary winding 14 (with corresponding inductance L2 and N2 turns in the corresponding coil). The flyback converter 100 has a primary or main switch (M1, 18) controlled by a control voltage signal (VcM1, 22) on the primary side. The flyback converter also includes a parasitic capacitance (Ceq, 20) that represents the total parasitic capacitance reflected across the primary switch and is disposed, on the primary side, between a terminal of the primary winding (L1, 12) and the ground 34. The source of the input voltage labelled as Vin or reference character 10 is connected to another terminal of the primary winding 12.

The converter also includes a synchronous rectifier (SR, 28) on the secondary side that is controlled by a control voltage signal (VcSR, 30), and an output capacitor (Co, 26) disposed between the ground 34 and the terminal of the secondary winding (L2, 14). The output voltage signal (Vo, 24) can be read across the capacitor (Co, 26). In the following, any of the primary winding(s) and secondary winding(s) are discussed as possessing a corresponding inductance. The terms "main switch" and "primary switch" may be used interchangeably.

Figure 2:
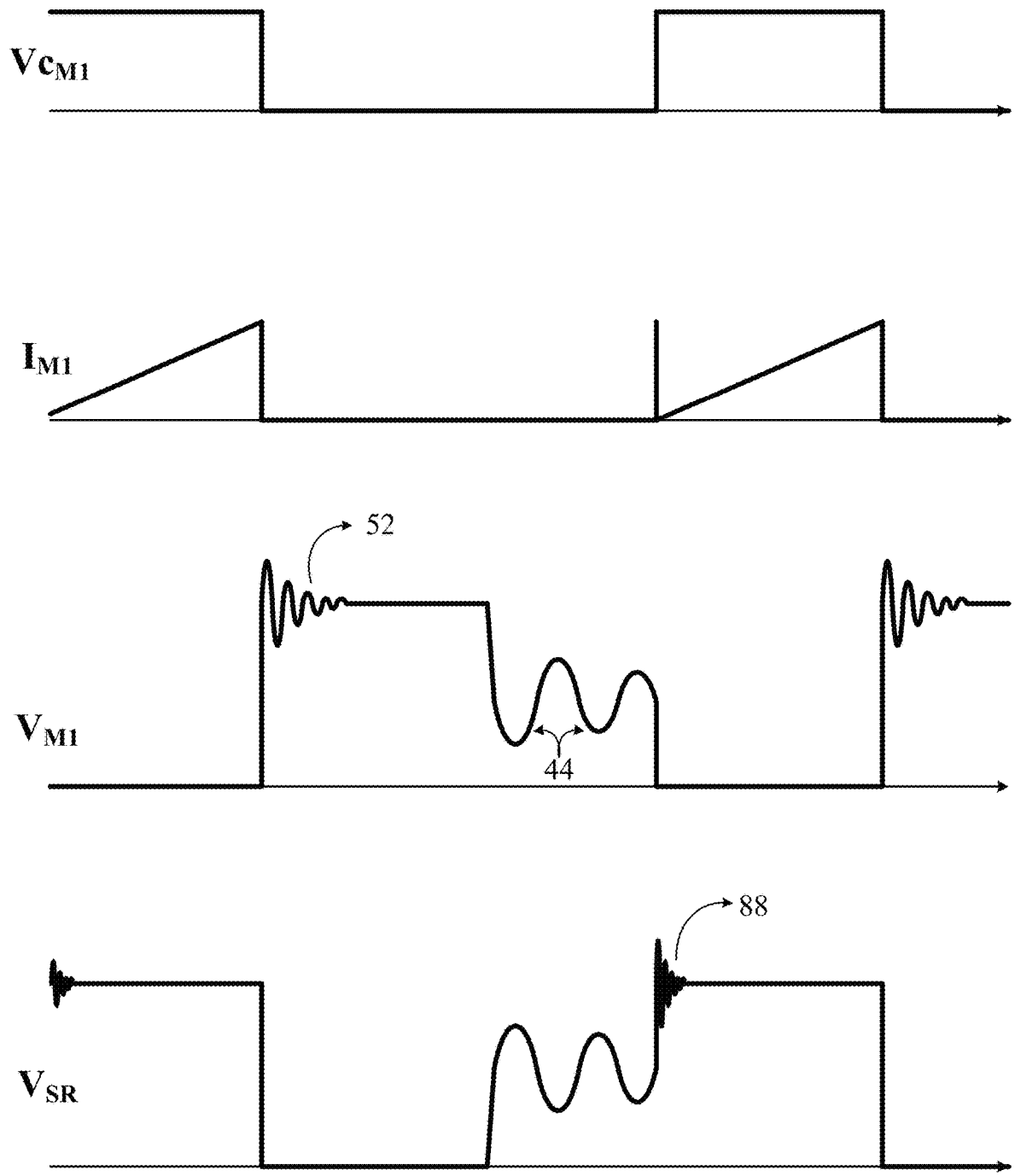
FIG. 2 illustrates waveforms of the converter of FIG. 1.

FIG. 2 illustrates the plots representing the key waveforms of a flyback converter 100 operating in discontinuous mode. These key waveforms are presented in order from top to bottom and include: 1) the control signal VcM1 for the main switch M1; 2) the current IM1 through the main switch; 3) the voltage across the main switch VM1; and 4) the voltage VSR across the synchronous rectifier 28. During the operation of the converter 100 of FIG. 1, there exists first the energy contained in the parasitic elements of the circuit (such as the leakage inductance, for example), which creates a ringing across the primary switch, shown as region 52 of the VM1 signal of FIG. 2. In a conventional flyback topology, such first energy is dissipated as is the second energy contained in the ringing portion 44 of the VM1 signal across the main switch during the dead time period. The ringing portion 44 contains the second energy at frequencies that are lower than frequencies corresponding to the ringing 52 and the first energy. In addition, there exists a third energy contained in the parasitic capacitance (Ceq, 20) reflected across the primary switch (M1, 18). In most of the conventional flyback converters, such energy is also dissipated and, therefore, lost during the operation.

For example, in the conventional 65 W flyback converter configured according to the schematic 100 and having a leakage inductance of 1.5 uH and operating at 150 kHz, the energy contained in the leakage inductance at full load is about 6.8 uJ.

The second energy, corresponding to the lower frequency ringing 44 across the main switch after the energy is fully delivered to the secondary side, has a lower value. For a parasitic capacitance Ceq of 260 pF, and 20V output voltage, such second energy is about 1.8 uJ. The energy contained in the parasitic capacitance (Ceq, 20) across the primary switch is also function of the input voltage (Vin, 10). For a parasitic capacitance of 260 pF and DC input voltage 10 of about 141 Vdc, the energy in Ceq is 2.58 uJ, while for a DC input voltage (Vin, 10) of about 373 Vdc the energy contained in Ceq is about 18 uJ. This energy is dissipated if the main switch (M1, 28) is "turned on" in hard switch mode. In most of the flyback converters this energy is dissipated. In addition, in hard switching mode there exists a ringing across the synchronized rectifier 88, as is shown in FIG. 2. The ringing across the synchronized rectifier 88 increases the noise and negatively impacts the electromagnetic interference ("EMI"), thereby requiring snubbers and the use of a higher voltage synchronized rectification.

The following descriptions discuss solutions to existing problems in the process of harvesting energy from the leakage inductance.

Example 1: Prior Art Flyback Converter with Passive Clamp

Figure 3A:
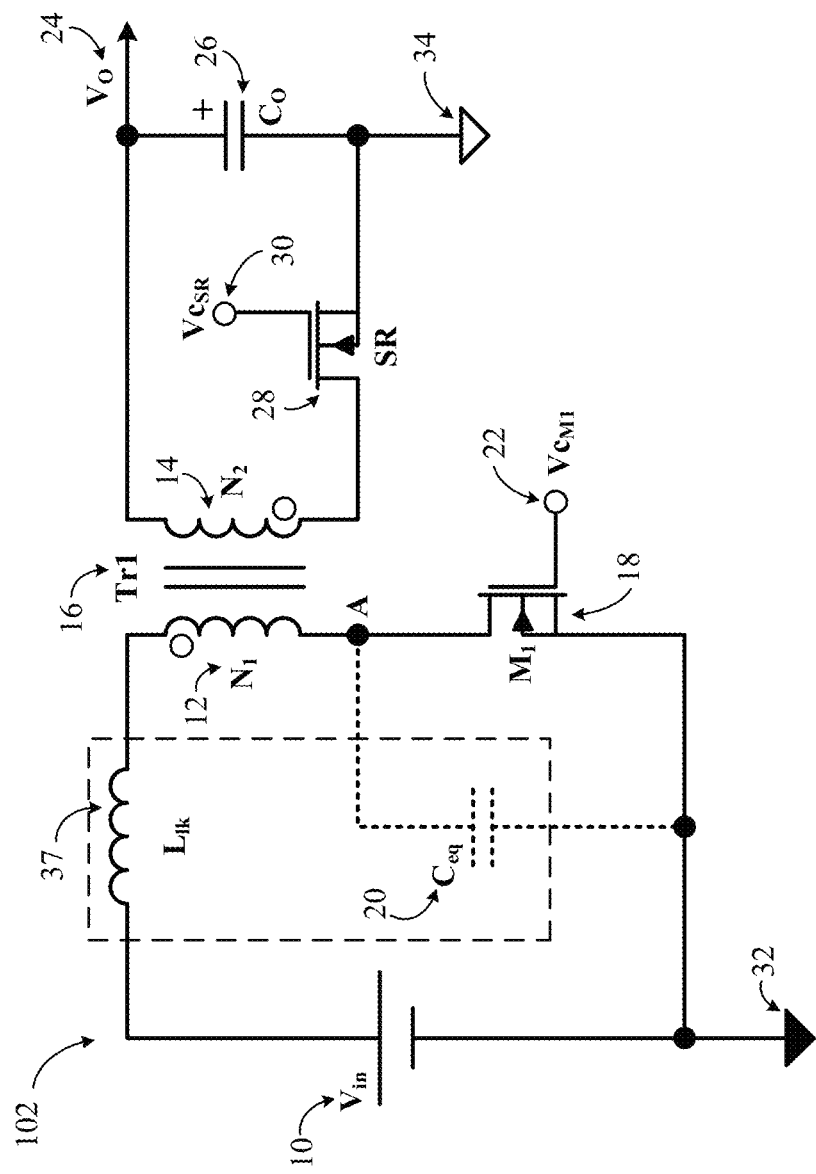
FIG. 3A is a schematic of a flyback converter.
Figure 3B:
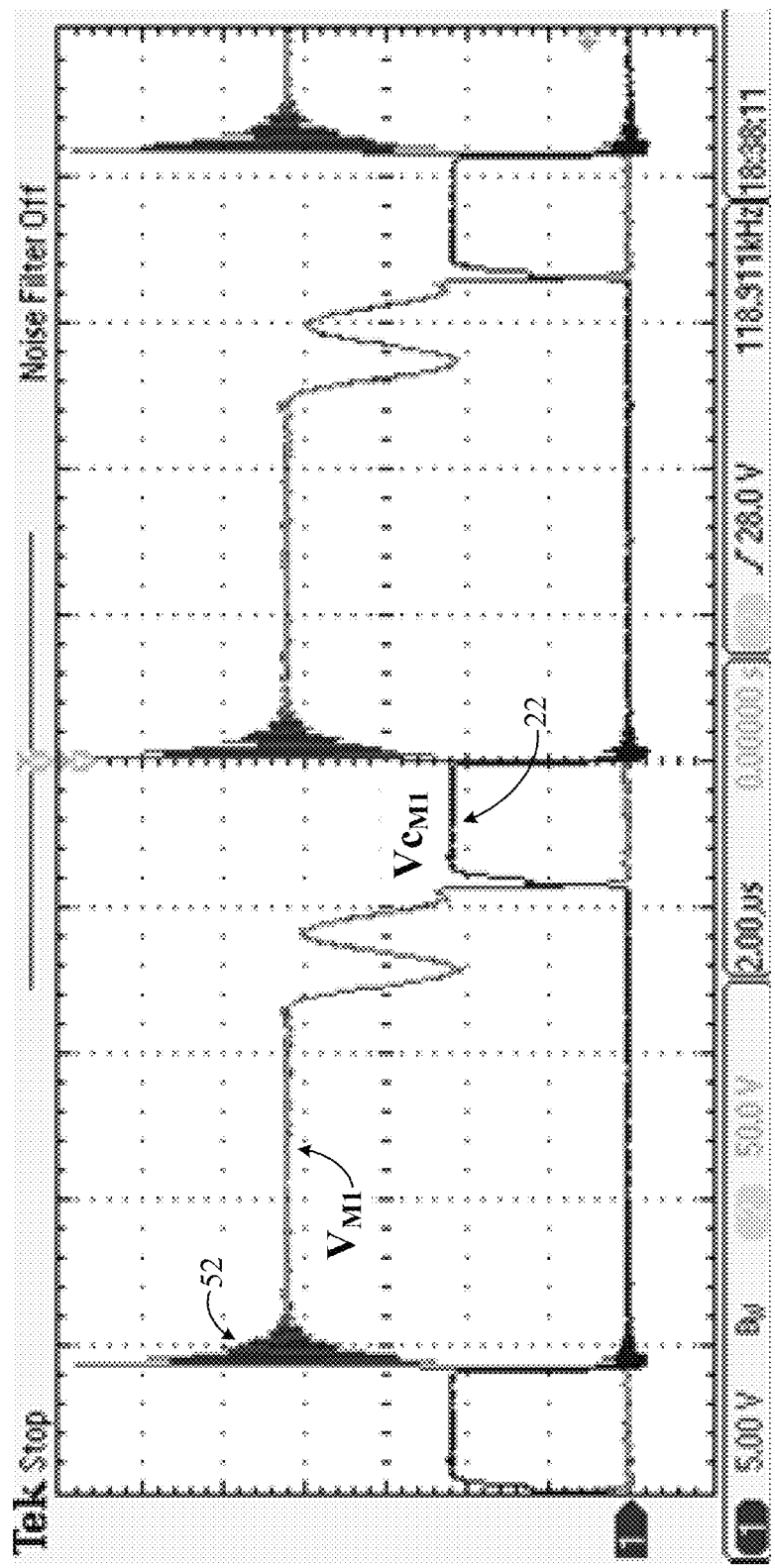
FIG. 3B illustrates waveforms of the converter of FIG. 3A.

One of the major drawbacks of flyback topology is that the leakage inductance between the primary and the secondary windings is not naturally recycled like in other topologies, such as in a two-transistor forward topology or in a full bridge topology. FIG. 3A presents a simplified schematic of a flyback topology 102, and FIG. 3B shows waveforms for that topology 102. It is noted here that some of the reference characters of the converter 100 are adopted to indicate similar elements. For example, both 100 and 102 have a main switch (M1, 18).

At the time when the main switch (M1,18) turns off, the energy stored in the magnetizing inductance of the transformer (Tr1, 16) is transferred to the secondary via the synchronized rectifier (SR, 28). The leakage inductance (Llk, 37) is shown in FIG. 3A as a discrete inductive element to help in understanding the operation of the flyback at the time when (M1,18) turns off. At the time when the main switch (M1,18) turns off, the leakage inductance (Llk, 37) starts resonating with the parasitic capacitance of the main switch (Ceq, 20), as depicted in FIG. 3B. This leads to very large voltage spikes which may exceed the voltage rating of the main switch (M1,18), as depicted in FIG. 3B.

The leakage inductance (Llk, 37) the parasitic capacitor reflected across M1 (Ceq, 20), and the input voltage source (Vin, 10) form a resonant circuit with initial conditions, which initial conditions include: the current flowing through Llk at the time when M1 turns off; the voltage across the M1; and the parasitic capacitance reflected across M1, which is the summation of the Coss of M1 (which is the parasitic capacitance of the switch M1 itself) and the parasitic capacitance reflected from the secondary winding through the transformer and the parasitic capacitance across the primary winding.

Figure 4A:
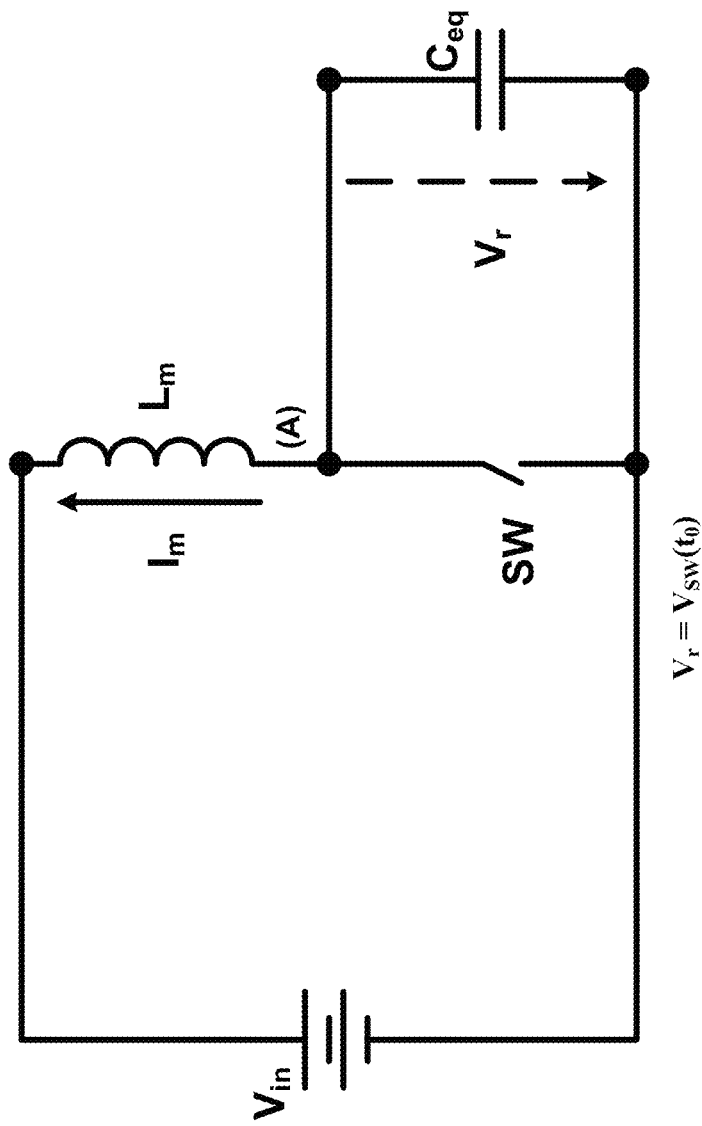
FIG. 4A is a schematic of a resonant circuit.

FIG. 4A shows a typical resonant circuit with initial conditions. The initial conditions include: Im, the current through the inductive element; Lm, the inductance of the inductive element; and Vr, the voltage across the ideal switch SW. FIG. 4B shows six equations (A)-(F); these characterize the behavior of the circuit of FIG. 4A. The equation (D) calculates the voltage across the switch SW and we can calculate the amplitude of the spikes across the switch SW at turn off and the frequency of ringing across the switch.

In conclusion, there is a need to find a solution to prevent the voltage across the main switch to increase and exceed the voltage rating of the main switch M1. Over the years, many solutions were developed to address this problem, such as different types of lossless snubber and even active clamp. However, all these solutions are complex and increase the number of parts and are relatively expensive.

A solution presented here is the RDC snubber. This solution it limits the voltage spikes across the main switch and is also relatively simple and low cost.

Figure 6:
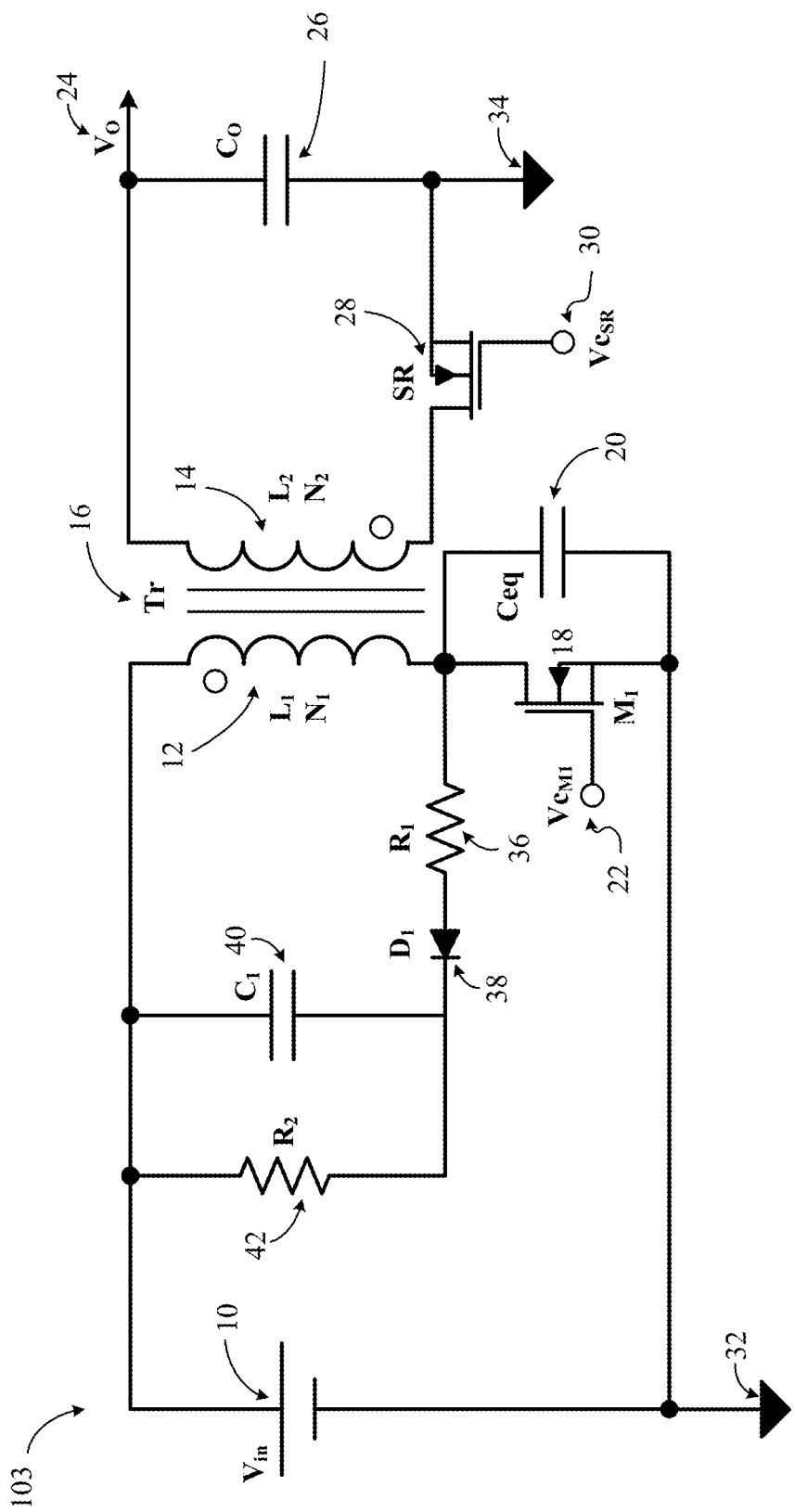
FIG. 6 is a schematic of an RDC snubber.

Briefly, FIG. 6 illustrates an RDC snubber 103, including a diode (D1,38), a capacitor (C1,40), a discharge resistor (R2,42) and a snubber resistor (R1,36). The characteristics of the diode D1 play affect the functionality of this type of snubber and, more specifically, the reverse recovery characteristic of the diode D1.

Figure 5A:
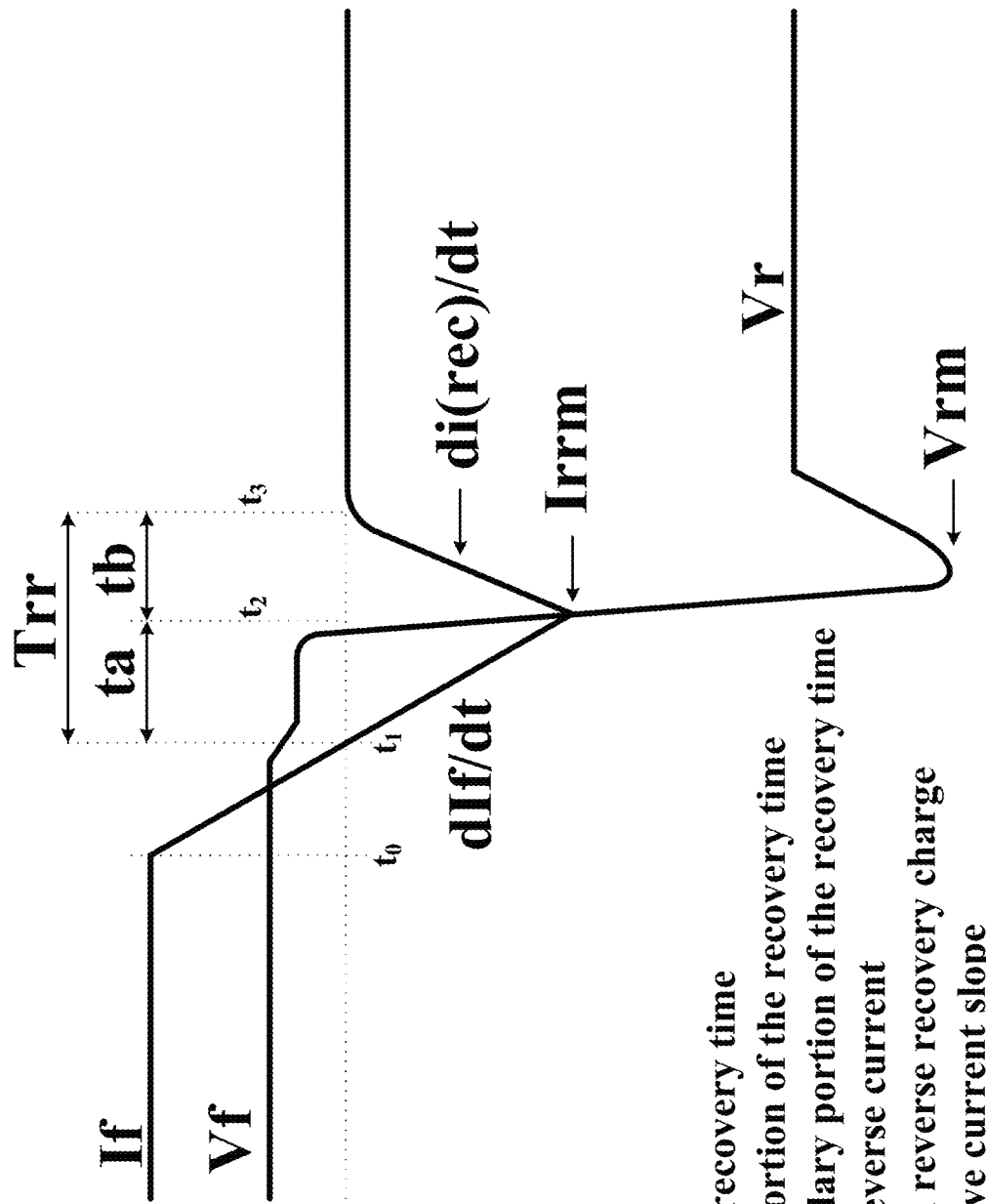
FIG. 5A illustrates reverse recovery characteristics of an exemplary diode.

In FIG. 5A, the reverse recovery characteristic of any exemplary diode, and key parameters which describe the reverse recovery, are shown.

Figure 5B:
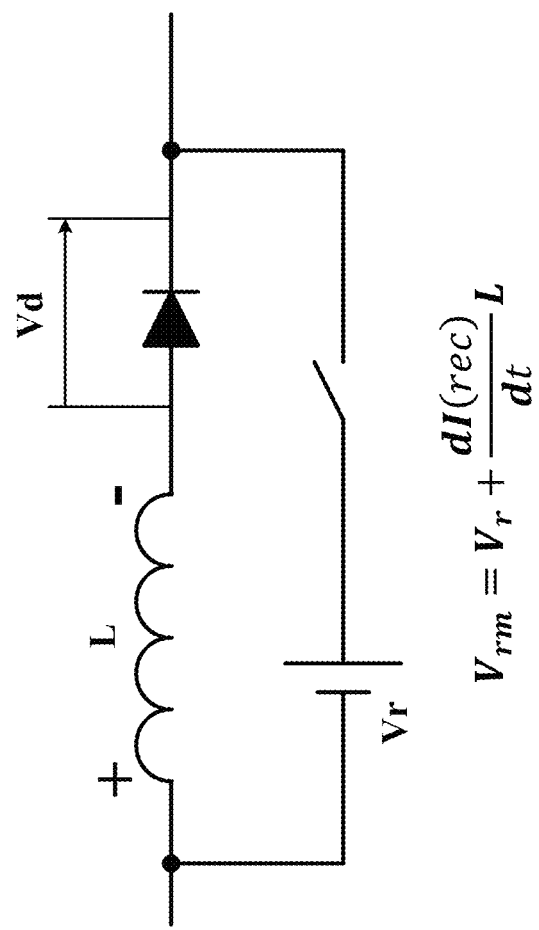
FIG. 5B illustrates an exemplary diode an equation for negative voltage.

When a forward current (If) is flowing through a diode and a reverse voltage Vr is placed at time t0 across the diode, the forward current (If) starts to decay with the slope proportional to the parasitic inductor element L. At time t1, the current through the diode reaches zero, and the charge present in the junction allows further conduction even with negative current until time t2, when the reverse current through the diode reaches its highest amplitude Irrm. Between times t1 and t2, the charge present in the junction is depleted and the diode becomes a high impedance element. The negative voltage across reaches the level Vrm, the amplitude of which is given by the formula in FIG. 5B. The slope of the current during the Tb portion of the reverse recovery time differentiates the diode as a soft reverse recovery wherein the dI(rec)/dt is smaller, rather than a snappy reverse recovery diode wherein dI(rec)/dt is higher. A key characteristic of the diode for application as a passive snubber is the time period ta, during which there is still charge in the junction.

Figure 7:
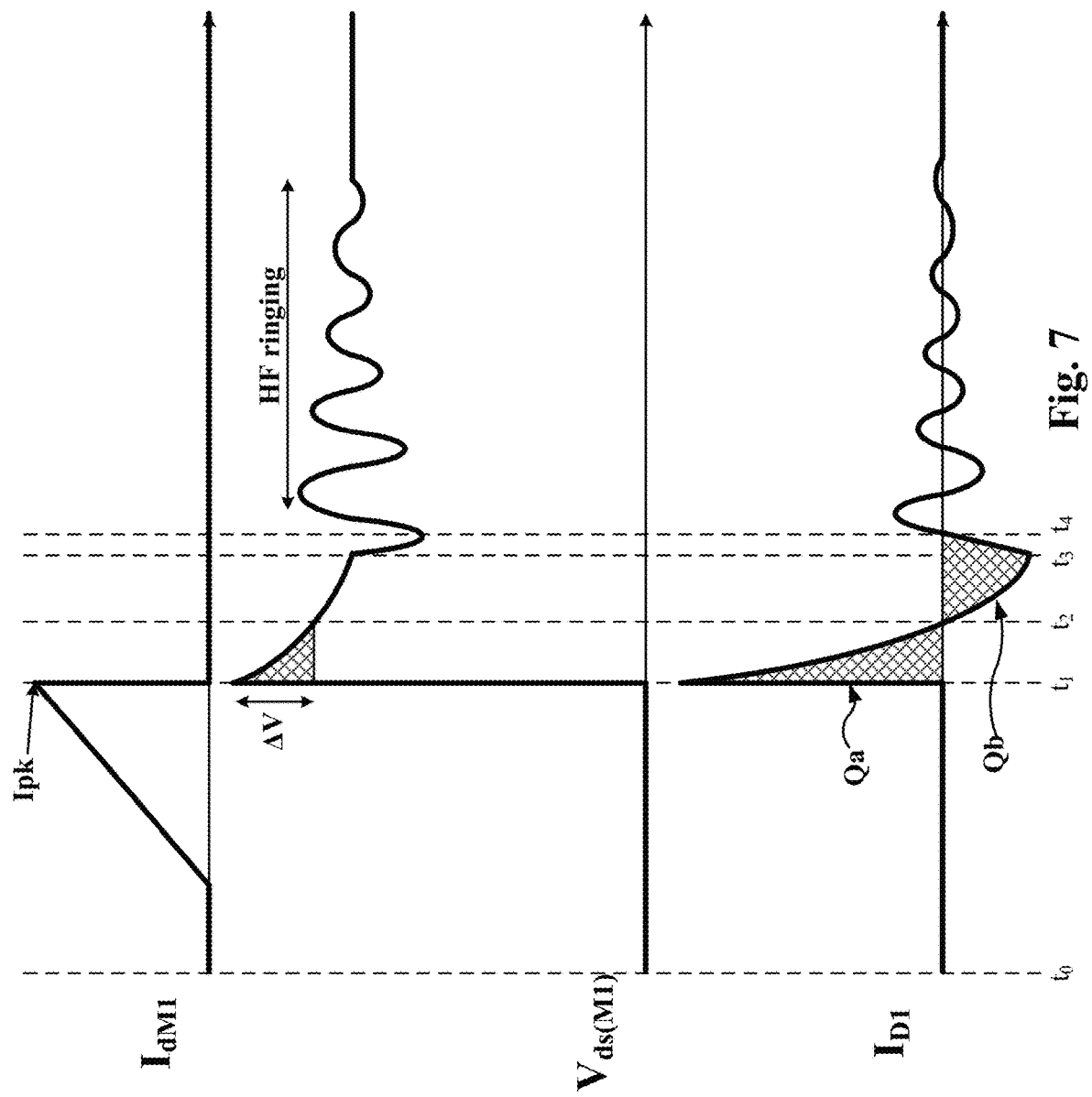
FIG. 7 illustrates waveforms for the RDC snubber of FIG. 6.

FIG. 7 presents key waveforms for the RDC snubber 103, which include: IdM1, the current through the main switch (M1,18); ID1, the current through the clamp diode; and Vds(M1), the voltage across M1.

At time t0, the main switch M1 turns on and the current through the transformer primary winding, (L1, 12), builds up to a peak level Ipk, which is reached at time t1.

At time t1, the main switch M1 turns off and the magnetizing current in the transformer Tr starts flowing into the secondary winding (L2,14) via the synchronized rectifier (SR,28). The leakage inductance current flows through the passive clamp via the snubber resistor (R1, 36) and the diode (D1, 38) into the clamp capacitor (C1, 40), which was slightly discharged by (R2, 42) prior to time t1. A resonant circuit is formed by the leakage inductance in the transformer Tr reflected in the primary and the capacitor (C1, 40) wherein the snubber resistor (R1, 36) acts as a dumping resistor.

Between times t1 and t2, the current through the diode D1 has a positive polarity and, during this time, C1 is charged. The charge flows into the capacitor C1, as shown by Qa, depicted by the shaded area under the curve between times t1 and t2. As presented in FIG. 5A, the current through a diode like D1 can flow in reverse due to the charge stored in the junction of the diode D1 between times t2 and t3.

At time t3, the charge in the junction of D1 is depleted, the diode D1 becomes a high impedance device, and the reverse recovery current through D1 reaches ID1(rrm), which is the peak reverse current. As depicted in FIG. 7, to comply with the preservation of charge Qa=Qb, which means that the charge which was injected in C1 between times t1 and t2 is transferred back to the secondary winding and further to Co during times t2 to t4. This is possible due to the reverse recovery characteristic of D1. The larger the reverse recovery time, especially during the Ta portion of FIG. 5A of the diode D1, and in this case the time difference between times t3 and t2 (referring to FIG. 7), the more charge is recycled to the secondary winding through (SR, 28) and to the secondary.

After time t3, the resonant circuit formed by the leakage inductance of the transformer and the capacitor (C1, 40) changes. This is due to the diode D1 which becomes a high impedance device when the charge in the junction of D1 is depleted. The new resonant circuit is formed now by the leakage inductance reflected in the primary of transformer Tr, and the parasitic capacitance of diode D1. The snubber resistor (R1, 36) becomes the dumping resistor of this resonant circuit. The capacitor C1 is still in the circuit, but its value is much larger than the parasitic capacitance of D1, and as a result, its impact in the resonant circuit is negligible.

Figure 8:
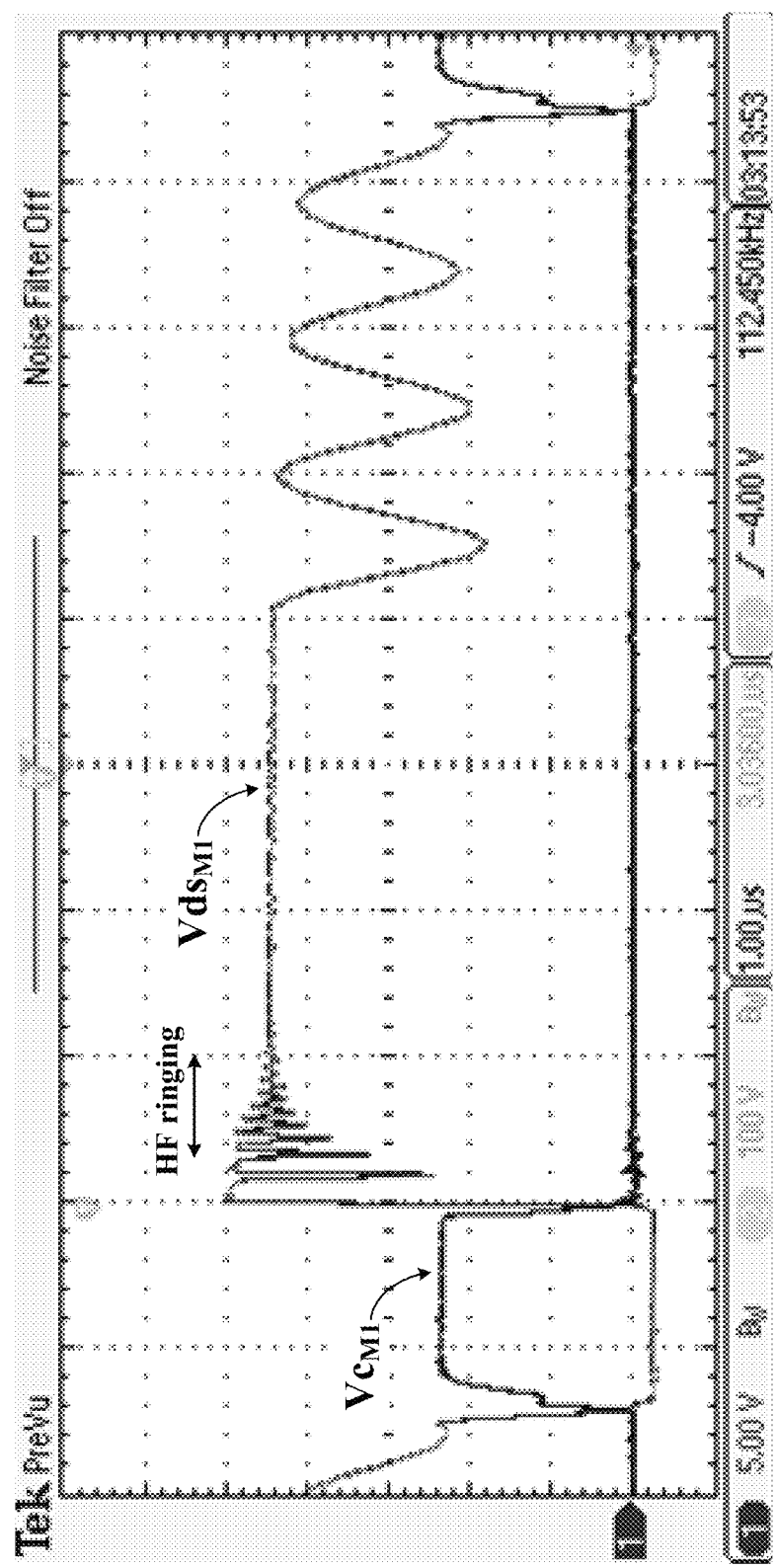
FIG. 8 illustrates voltage across a main switch of a flyback converter, showing ringing.

The high frequency ringing ("HF ringing") caused by the resonance between the leakage inductance reflected in the primary of the transformer (Tr, 16) and the parasitic capacitance of the diode D1 in parallel with the parasitic capacitance Ceq across the primary switch M1 creates an oscillation across the primary switch M1, as depicted in FIG. 8, which shows the voltage across the main switch in a flyback topology with a DC input voltage of 327 Vdc, a turn ratio in the transformer of 5.0 and an output voltage of 20V, and a leakage inductance in the transformer of 2.1 uH, and the part number used for D1 is S3N.

Figure 9:
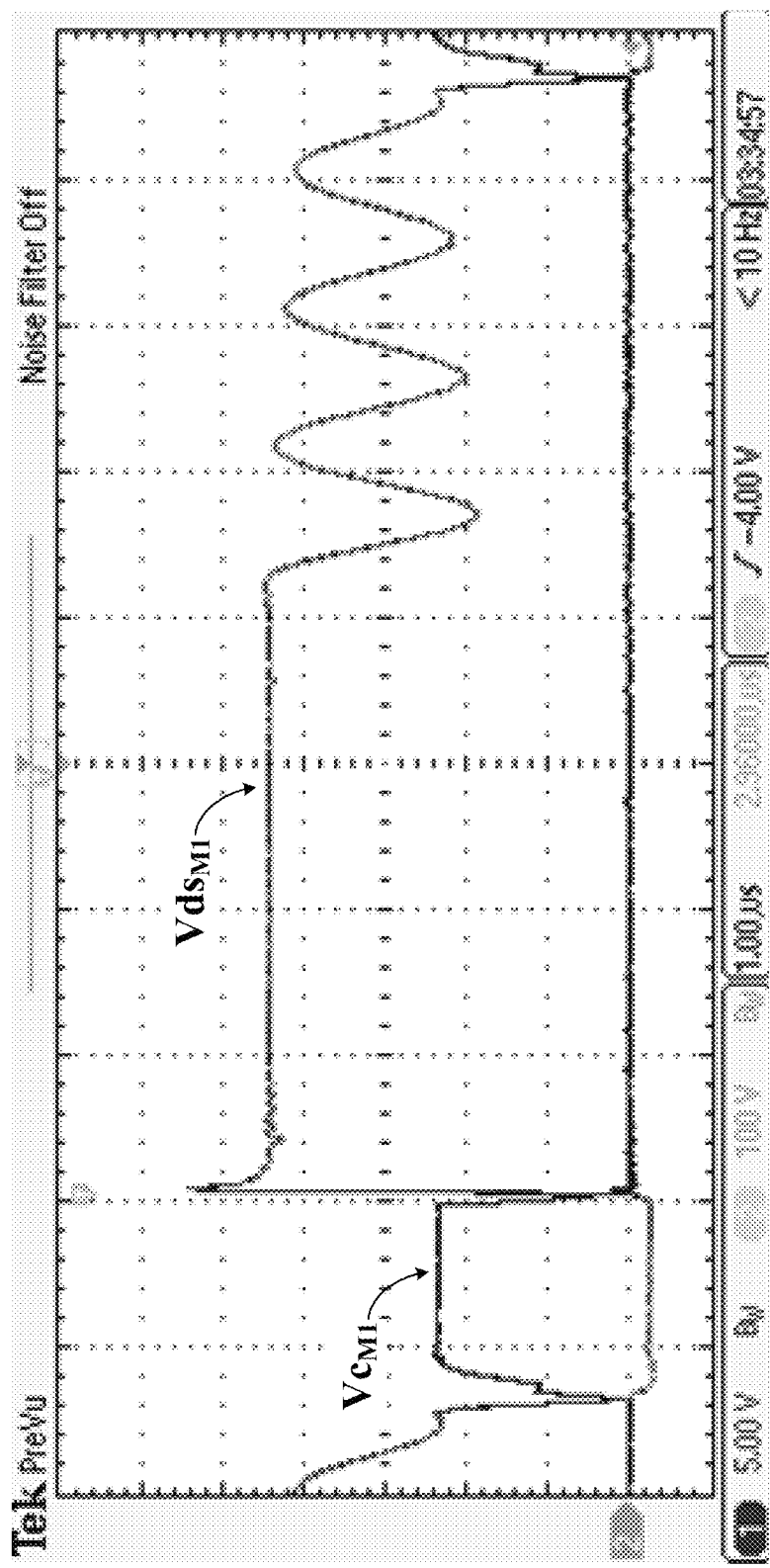
FIG. 9 illustrates voltage across a main switch of a flyback converter using a snubber, showing damping of ringing.

The snubber resistor R1 can have a strong impact in the attenuation of the ringing across the main switch. FIG. 9 illustrates the voltage across the main switch using the same transformer Tr and the same parts at the same input and output conditions with the snubber resistor of 51 Ohm. Though the ringing across the main switch at the time when M1 turns is no longer present, the peak voltage across the main switch in the same conditions increases from 500V in FIG. 8 to 560V in FIG. 9. In addition, there is a decay in efficiency because a snubber using a resistor in series with the diode is dissipative. The additional voltage across the main switch is due to voltage across the snubber resistor R1, caused by the peak current through D1, creating the change in voltage, or ΔV, as depicted in FIG. 7.

In conclusion, the passive snubber solution does limit the voltage stress on the main switch and function of the reverse recovery characteristics of D1, and some of the leakage inductance energy is recycled to the secondary by the reverse conduction through the diode due to the reverse recovery characteristic of the diode D1. The high frequency ringing across the main switch which appears after the charge in the junction of D1 is depleted, due to the oscillation between the leakage inductance of the transformer (Tr, 16) reflected in the primary, and the parasitic capacitance of the diode D1 after the charge in the diode D1 junction is depleted in parallel with the parasitic capacitance Ceq.

Example 2: Prior Art Flyback Converter with Active Clamp

Figure 10:
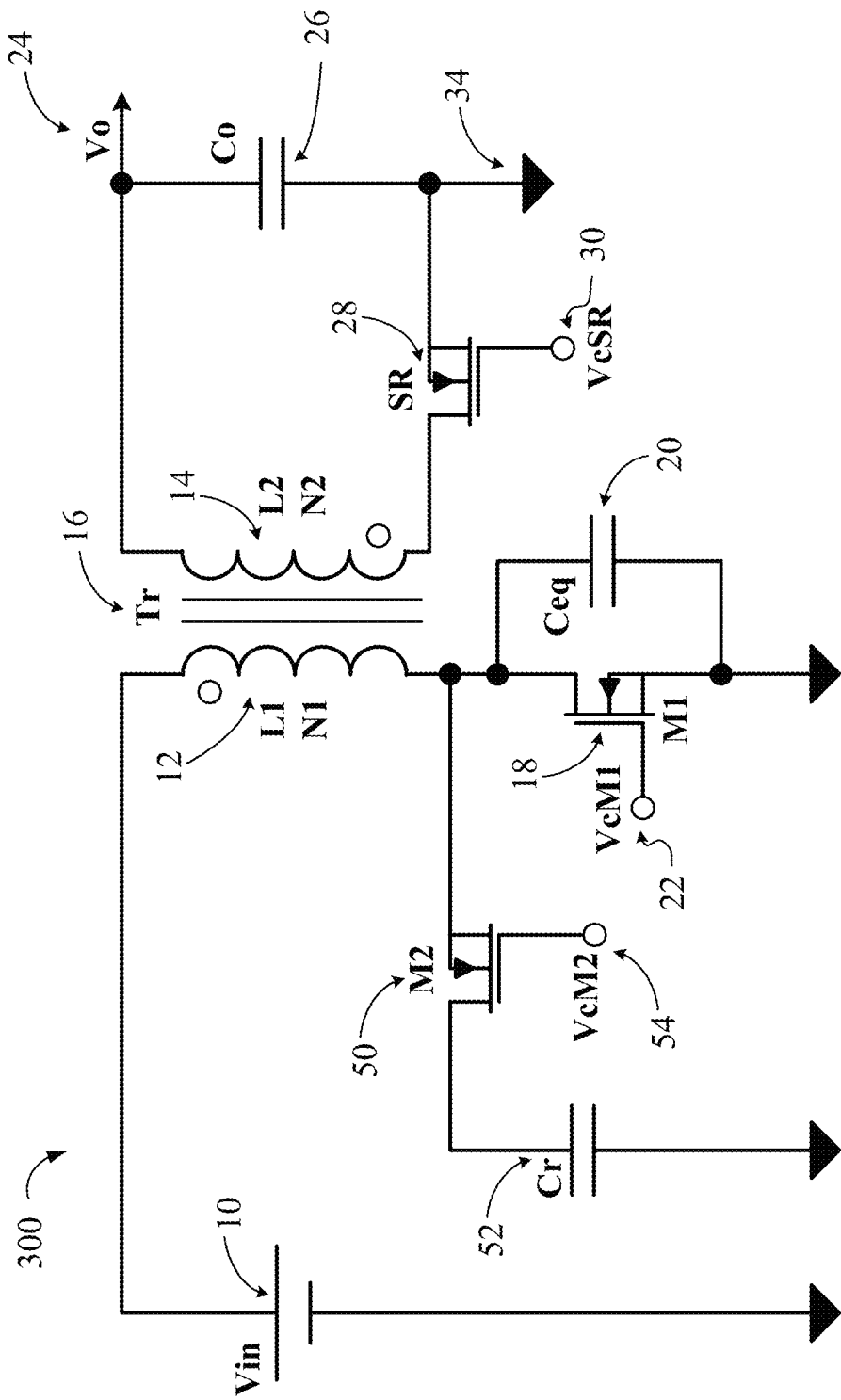
FIG. 10 is a schematic of a flyback converter with an active clamp.

One attempt for harvesting the energy of the leakage inductance was to use an active clamp, as disclosed in U.S. Pat. No. 5,434,768. FIG. 10 illustrates the attempt of U.S. Pat. No. 5,434,768 as applied to circuitry 300 of a flyback converter. Besides the general flyback circuitry 100 presented in FIG. 1, the circuitry 300 adds a clamp or complementary switch M2, 50, controlled by a control voltage signal VcM2, 54. The circuitry also includes a clamp capacitor Cr, 52. The switch 50, control voltage signal 54, and clamp capacitor 52 together cooperate to define an active clamp connected between one terminal of the primary winding L1 and the ground.

Figure 11:
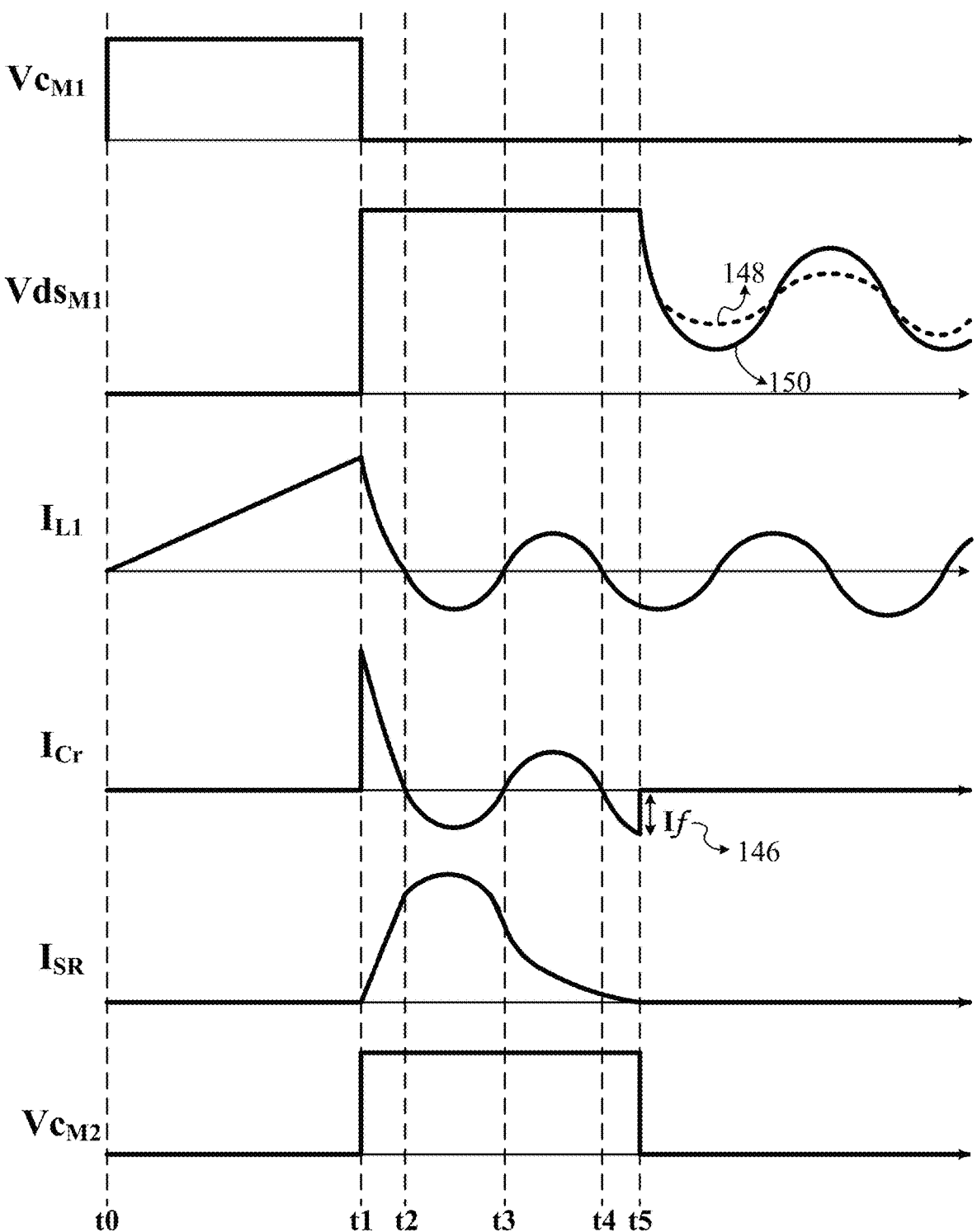
FIG. 11 illustrates waveforms of the flyback converter of FIG. 10.

FIG. 11 illustrates the key waveforms of the flyback circuit 300 with the active clamp of FIG. 10. These waveforms are presented in order from top to bottom and include: 1) the control signal VcM1 (for the main switch M1); 2) the voltage across the main switch, VdsM1; the current IL1 through the primary winding (L1, 12) of the transformer Tr, 16; 3) the current ICr through the clamp circuit formed by Mosfet M2 and clamp capacitor Cr; 4) the current IsR through the synchronized rectifier (SR, 28); and 5) the control voltage signal for the clamp Mosfet (M2, 50), VcM2.

With reference to the horizontal axis, between times t0 and t1, the main switch M1 is switched on, and the current IL1 starts to build up through the magnetizing inductance, thereby storing energy in the transformer Tr. At the moment t1, the primary switch turns off, and as a result the magnetizing current starts flowing into the secondary winding. The leakage inductance reported to the primary side and the clamp capacitor 52 form a resonant circuit. The current through the leakage inductance starts flowing through the clamp capacitor 52 and the resonant circuit, formed by the leakage inductance, and the clamp capacitor 52 shapes the current through the clamp circuit formed by M2 and Cr, accordingly. As can be seen from the waveforms of FIG. 11, the current ICr through the clamp capacitor Cr is characterized by ringing at the frequency(ies) determined by the resonant frequency between the leakage inductance and the clamp capacitor 52.

Initially, the current ICr flows through the clamp capacitor Cr, 52 decaying and substantially reaching a zero level at time t2. Between the times t2 and t3, the current through the clamp capacitor Cr becomes negative (which means that the current will be transferred to the secondary side, as depicted by the shape of the curve labeled ISR, which represents the current through the synchronous rectifier SR). Between the times t3 and t4, the current ICr through the clamp circuit turns positive again, and then reaches the zero level again at about time t4. After time t4, the current through the clamp circuit turns negative until the clamp switch M2 turns off at time t5; the energy contained in the magnetizing current adds to the existing energy contained in the resonant circuit that is formed by the primary winding (L1, 12) and the parasitic capacitance (Ceq, 20) reflected across the main switch. At time t5, the current through the clamp circuit is shown to have negative amplitude (If, 146), and this current increases the amplitude of ringing during the dead time of the flyback converter from 148 to 150 (as shown in the broken-line and solid-line curves of VdsM1).

The number of ringing cycles or undulations, as well as the polarity of the current passing through the clamp capacitor Cr, is a function of the time at which the clamp switch M2 is switched "off" and the resonant frequency formed by leakage inductance and the clamp capacitor Cr. Accordingly, the number of such undulations and/or polarity of the current through Cr may vary. The clamp circuit (formed by M2 and Cr) takes the leakage inductance energy initially by charging the clamp capacitor (Cr, 52), and some of the energy is transferred to the secondary side while some of the energy is bounced back (to the primary side) and forth before the active clamp switch turns off. At time t5, when the clamp switch turns off, the energy remaining in the magnetizing inductance adds up to the energy contained in the resonant circuit formed by the inductance of the primary winding and the parasitic capacitance, (Ceq, 20), reflected across the main switch (M1, 18). In some applications of the related art, the negative current (If, 146) passing through the clamp capacitor 52 at time t5, when the clamp switch turns off, is tailored to add to the energy in the resonant circuit formed by the inductance of the primary winding of the transformer and the parasitic capacitance (Ceq, 20) in order to increase the ringing amplitude and—by using the valley detection approach to turn on the main switch at a lower voltage level (or even at a zero voltage level) if the flyback operates in critical conduction. A person of skill in the art will readily appreciate that the approach known as "valley detection" includes identification of the valley(s) or the portion(s) of the curve VdcM1 around the local minimum(s) of the ringing after time t5 and tuning the main switch "on", at the moments corresponding to these valley(s) to reduce the main switch losses.

Some of the energy from the leakage inductance is used to decrease the switching losses or even eliminate them if the flyback operates in critical conduction mode, where the main switch M1 turns on at the first "valley" (or minimum) of the ringing portion of the signal. As alluded to above, the leakage inductance energy is typically lost in conventionally-configured circuitry.

Example 3: Recovery of Energy from Leakage Inductance

Another methodology of harvesting the leakage inductance was presented in U.S. patent application Ser. No. 16/158,202, filed Oct. 11, 2018 and entitled Energy Recovery From The Leakage Inductance Of The Transformer, the disclosure of which is hereby incorporated by reference.

Figure 12:
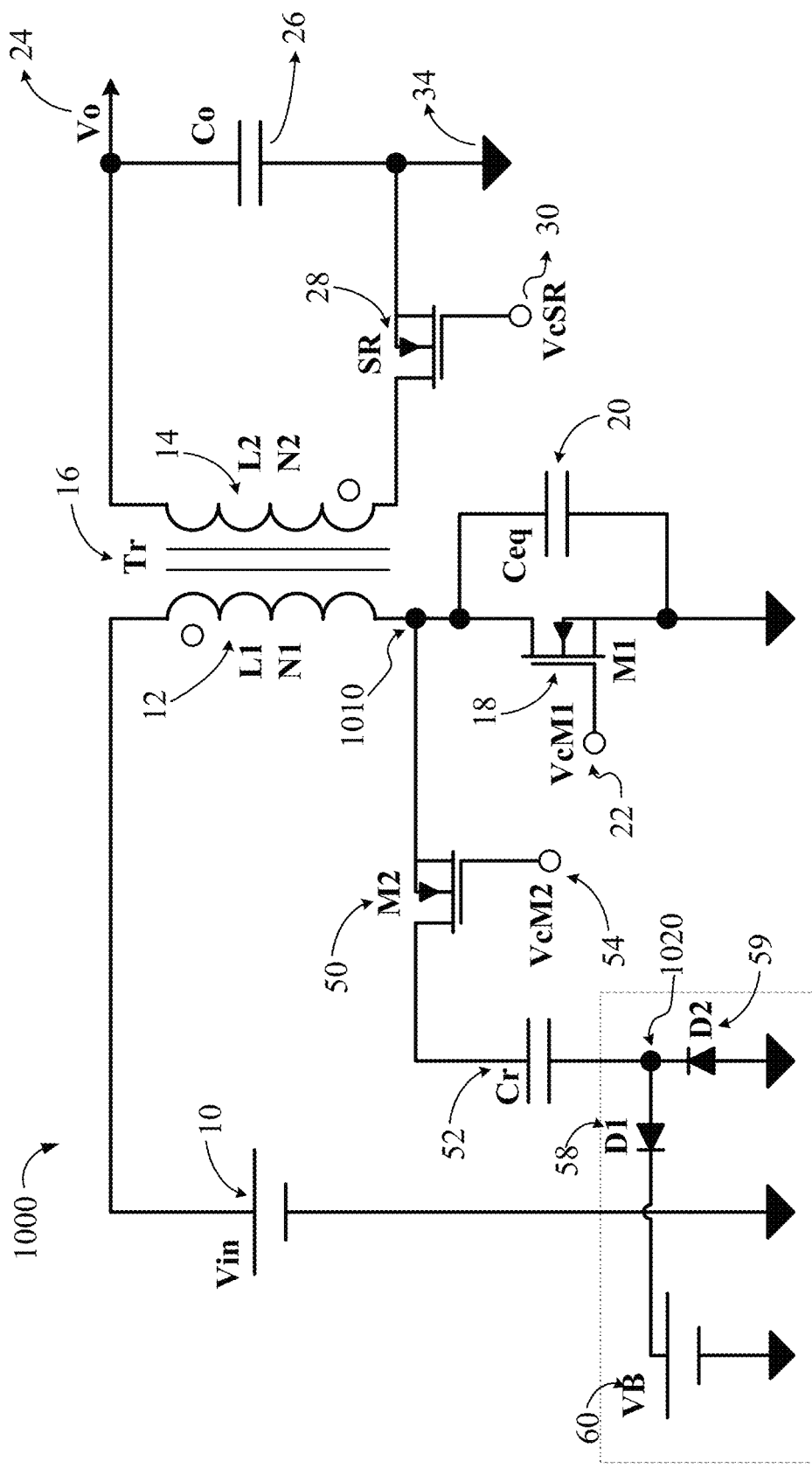
FIG. 12 is a schematic of a flyback converter with an active clamp.
Figure 13:
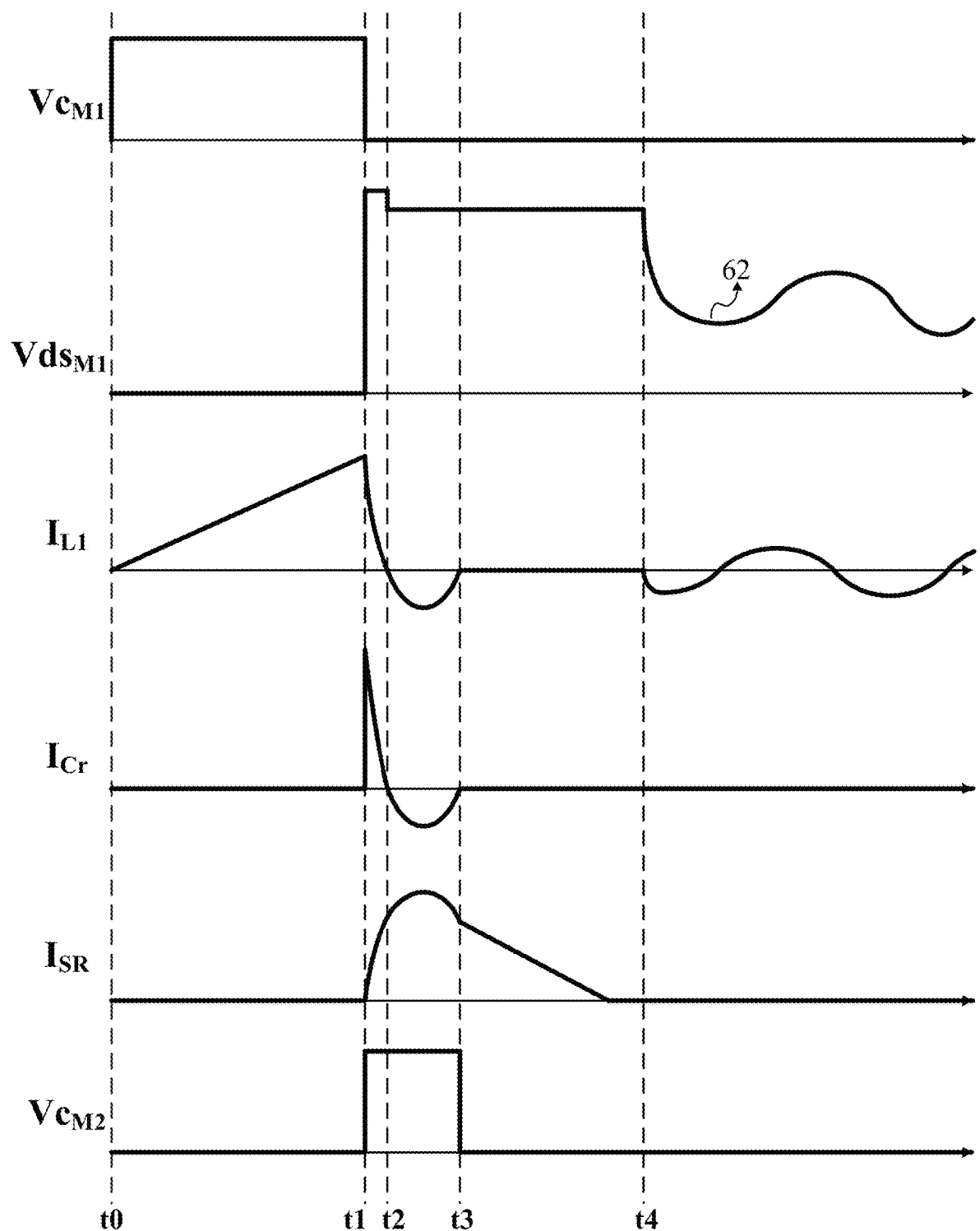
FIG. 13 illustrates waveforms of the flyback converter of FIG. 13.

This method of harvesting the leakage inductance energy is discussed in reference to FIG. 12 and FIG. 13. Here, a problem of wasting electromagnetic energy, or "EM", (of leakage inductance of the flyback with active clamp circuitry) contained in a ringing portion of the clamp circuitry waveform and circulating through the clamp circuitry is addressed by complementing the flyback with an active clamp circuit including an auxiliary electronic system or component configured to store EM energy (such as, in one embodiment, an auxiliary source of voltage) and charging such an auxiliary system or component with this (which is otherwise wasted, as in related art solutions) energy through an electronic valve attached to the clamp circuit. The act of the auxiliary EM storage system is carried out to reduce the RMS current passing through the clamp portion of the overall circuitry and at the same time reduce the ringing.

As shown, the primary side of the overall circuitry 1000 includes the primary winding L1 of the transformer (Tr, 16) having N1 turns in its primary winding. One terminal of the primary winding L1 is directly connected to the source of the DC input voltage (Vin, 10), and another terminal of the primary winding (L1,12)—shown as the node 1010—is connected with the active clamp formed by the clamp or complementary switch (M2, 50) and the clamp capacitor Cr, 52. The clamp switch is controlled by the source of control voltage signal VcM2, 54.

The secondary side of the overall circuitry 1000 includes the secondary winding L2 of the transformer (Tr, 16) that has N2 turns in its secondary winding L2 and the synchronous rectifier (SR, 28).

As shown, two rectifiers means are connected to the clamp capacitor (Cr, 52). In this exemplary embodiment, rectifier means are depicted as diodes. The first rectifier (D1, 58) has its anode connected to the clamp capacitor (Cr, 52), at the node 1020, the second rectifier (D2, 56) has its anode electrically connected to the input ground and its cathode to the clamp capacitor (Cr, 52) at the node 1020. An energy storage component configured to store electromagnetic energy (shown here as the voltage source (VB, 60)), is further added between the ground and the cathode of the first rectifier. This electronic circuitry addition to the active clamp portion of the circuit 1000 is designated with the reference character 1030. The sub-circuit designated as 1030 is also identified herein as an "energy extraction circuit".

The key waveforms representing the operation of the circuit 1000 are schematically depicted in FIG. 13. These include, from top to bottom: 1) the control signal (VcM1, 22) of the main switch M1; 2) the voltage VdsM1 across the main switch M1; 3) the current IL1 through the primary winding L1 of the transformer (Tr, 16); 4) the current ICr through the clamp capacitor Cr; 5) the current ISR through the synchronous rectifier (SR, 28); and 6) the control signal (VcM2,54) for the clamp switch M2.

Referring to FIG. 12, during the operation of the circuitry 1000, and in the period between time t0 and t1, the main switch M1 is configured to conduct, and the magnetizing current builds up the transformer Tr. At the time period t1, the main switch M1 turns off (shown as VcM1 reaching zero) and the magnetizing current starts flowing towards the secondary winding (L2, 14) and through the synchronous rectifier (SR, 28). The current flowing through the leakage inductance of the primary side starts flowing though the clamp circuit formed by (M2, 50) and the clamp capacitor (Cr, 52), and then through the first rectifier (D1, 58) towards the auxiliary energy storage, depicted as voltage source (VB, 60). Unlike in the previous examples of circuits discussed above, and in contradistinction with such examples, the current from the leakage inductance here is directed towards the voltage source VB, 60.

This directionality completely changes the mode(s) of the operation of the clamp circuit: for example, a comparison of the shape of ICr representing the current passing through the clamp capacitor (Cr, 52) of FIG. 11 with that of FIG. 13 immediately illustrates the advantageous nature of operation of the embodiment 1000. The ringing portion, associated with the resonance between the leakage inductance and the clamp capacitor as depicted in FIG. 11 (see the period from times t2 to t4) substantially disappears, and the time interval between times t1 and t2 (during which the current though the clamp capacitor reaches the zero level) substantially shortens. As a result, the charge injected into the clamp capacitor Cr (and substantially corresponding to the area under the ICR curve between the times t1 and t2) is significantly decreased in the case of operation of the circuitry 1000 as compared to that of the circuitry whose operation is described in FIG. 11. As a result, the electrical charge extracted from the clamp capacitor between times t2 and t3 is decreased as well. Injecting (delivering) the current through the diode D1 into a voltage source (auxiliary storage of EM energy) VB causes the transfer of energy to the voltage source VB and produces a dumping effect, substantially reducing the ringing in the active clamp portion of the circuitry 1000. In this embodiment, a significant portion of the leakage inductance energy is transferred to the voltage source (VB, 64). The time interval between times t1 and t2 is a function of the voltage across VB. For a larger value of VB, the time interval between times t1 to t2 decreases, comparatively. The voltage across VB is reflected across the voltage across the main switch, as depicted in the Vds M1 of FIG. 12 (VB is the "overshoot" portion of the VdsM1 curve, which is characteristically not present in corresponding VdsM1 curve of FIG. 11). A reduction of the duration of the time interval from t1 to t2 leads to a considerable decrease of the RMS current through clamp circuit formed by M2, 50 and Cr, 52.

As an example, in a conventional 65 W flyback converter having a leakage inductance of 1 uH and a clamp capacitor of 100 nF, the RMS current ICr through the clamp circuit is about 0.313A when the structure and operation shown in FIGS. 10 and 11 is used. However, and in advantageous comparison, when the flyback converter is equipped with the additional storage circuitry 1030 according to FIG. 12 and the principle of operation illustrated in FIG. 13 is carried out, for a VB=10V, the RMS current ICr through the clamp circuit is decreased to about 0.185A (that is, at least 0.128A lower, or 40% lower). With that, the power dissipated in conduction in M2 (which is proportionate to the square of the RMS current) is reduced by about 2.98 times.

In the case of somewhat higher leakage inductance (such as, for example, 4 uH) the advantageous impact of the circuitry portion 1030 is even stronger. Specifically, with the use operational principles described with respect to FIGS. 10 and 11, the RMS current through the clamp circuit would be about 0.527A. However, if the energy extraction circuit 1030 as shown in FIG. 12 is used according to the principle of FIG. 13, then for a VB of about 10V, the RMS current through the clamp circuit is reduced to about 0.249A (that is, by about 52%).

In addition, or in the alternative, and further comparing the results of operation described with respect to FIG. 10 with those with respect to FIG. 12, the time interval measured between the times t1 and t2 in FIG. 11 is about 1.12 us. On the other hand, for the circuitry 1000 incorporating the sub-circuit 1030 from FIG. 12, the time interval t1 to t2 is reduced to about 0.644 us for Vb of 10V.

It should be appreciated, therefore, that the circuit 1030 improves the operation of the flyback converter with an active clamp by substantially reducing the RMS current passing through the clamp capacitor.

Example 4: High Efficiency Rompower Passive Clamp

The solution presented in Example 3 has many advantages in comparison with the solution presented in Example 2 and Example 1. However, it requires an active clamp, which uses another switching element and a floating drive, which increases the cost of the solution. For applications such as AC-DC adapters, cost and simplicity are paramount.

The embodiment presented here processes the leakage inductance energy which is non-dissipative, and the energy from the leakage inductance is recycled back to the secondary and some of it is used for other purposes. This helps eliminate the ringing and spikes depicted in Example 1, and also does so without dissipation, as in Example 3.

In Example 3, the presence of the energy extraction circuit 1030 reduces the charge injected in the clamp capacitor Cr during the time interval from t1 to t2. As a consequence, in compliance with the law of conservation of charge, the charge which is extracted from Cr during the time interval between t2 and t3, will also decrease. For a given leakage inductance in the transformer, a given amplitude of the peak current through the primary winding, and a given VB level, the charge injected and also the charge extracted from the clamp capacitor Cr will become comparable with the reverse recovery charge. In such situations, the active clamp switch (M2, 50) of FIG. 12 can be replaced by a diode (Dc1, 86) of FIG. 14, and the basic mode of operation does not change. However, the energy extraction circuit 2030 of FIG. 14 allows a full active clamp function while using a diode and employing the reverse recovery characteristic of the diode. The interval between times t2 and t3 (in FIG. 13) is then reduced by the use of the energy extraction circuit to become comparable with the reverse recovery time of the diode Dc1 from FIG. 14.

For many years, power conversion engineers have looked for a solution using a passive clamp which would emulate the function of an active clamp, wherein the leakage inductance energy is fully recycled. However, in most of the applications the charge injected and further extracted from the clamp capacitor were too much to be able to make this concept work. In other words, attempts at solving this problem had been made without a successful solution in the prior art.

The introduction of the energy extraction circuit 2030 significantly decreases the charge injected and retrieved from the clamp capacitor Cr to make the above-described concept work over the entire operating conditions of the flyback converter.

The advantages associated with the circuit from Example 3, wherein the charge transferred to the clamp capacitor is much smaller and, as a result, the reverse current also has a smaller charge, allow the use of only one simple diode instead of an active switch.

Figure 14:
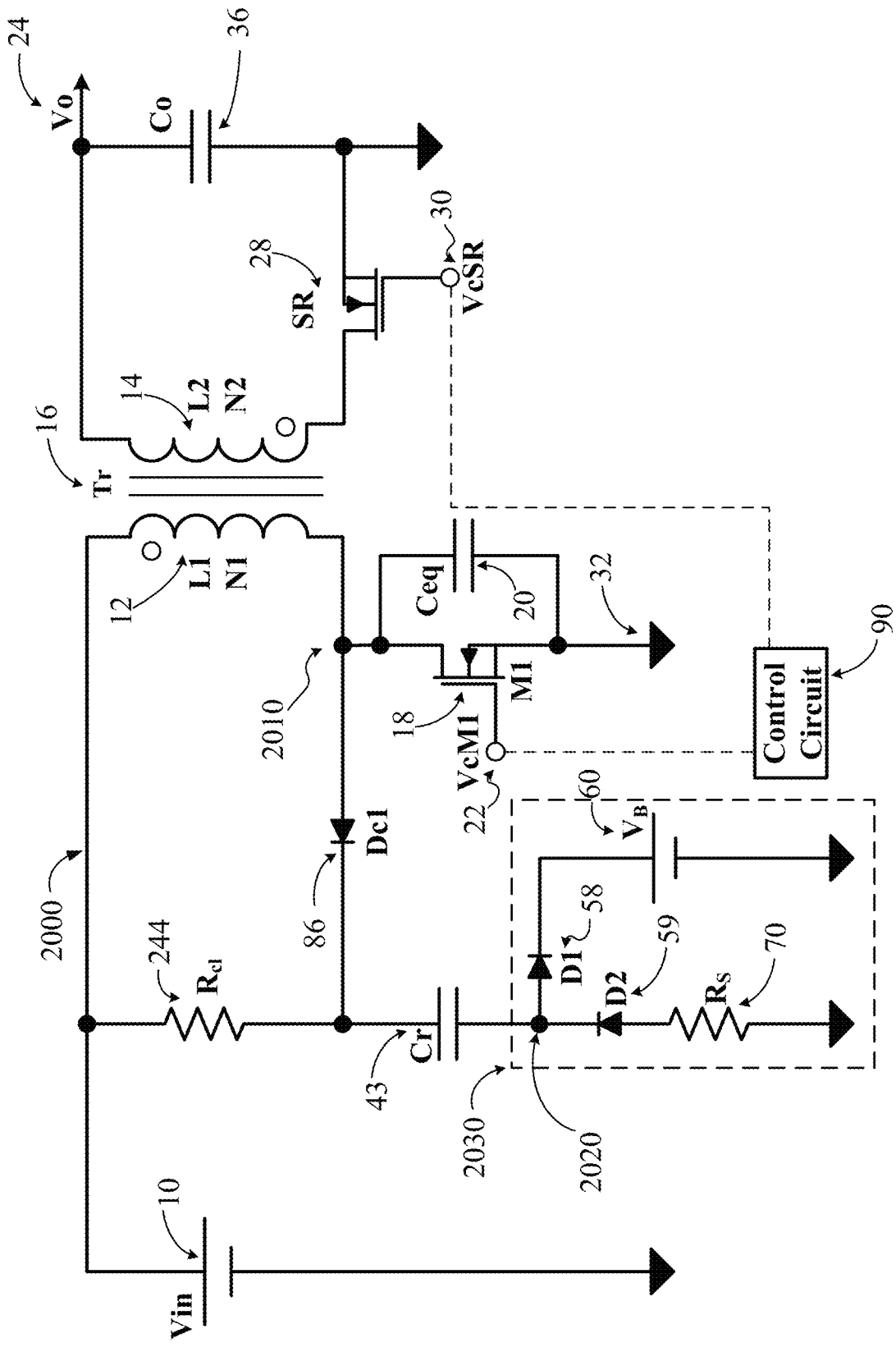
FIG. 14 is a schematic of a flyback converter with a passive clamp.

FIG. 14 presents a passive clamp circuit 2000. As shown in FIG. 14, the primary side of the overall circuit 2000 includes the primary winding L1 of the transformer (Tr, 16) which has N1 turns in its primary winding. One terminal of the primary winding L1 is directly connected to the source of the DC input voltage (Vin, 10) and another terminal of (L1, 12)—shown as the node 2010—is connected to the diode Dc1, 86 in series with the clamp capacitor (Cr, 43) and further connected in series with an energy extraction circuit 2030. There is a pullup resistor Rc1, 244, placed between the source of the DC input and the connection between the clamp diode (Dc1, 86) and clamp capacitor (Cr, 43). The energy extraction circuit 2030 is an electronic component formed by several elements: two rectifiers (or rectifier means, which in this example are depicted as diodes), the first rectifier (D1, 58) has its anode connected to the clamp capacitor (Cr, 43) at the node 2020, the second rectifier (D2, 59) has its anode electrically connected to a resistor (Rs, 70) which is further connected to the input ground, and also has its cathode connected to the clamp capacitor (Cr, 52) at the node 2020. The energy extraction circuit further includes an energy storage (shown here as the voltage source (VB, 60)) disposed between the ground and the cathode of the first rectifier (D1, 58). This energy extraction circuit 2030 thus is an electronic component also known as a sub-circuit; it contains a group of electronic devices which perform a certain, specific function.

The secondary side of the overall circuitry 2000 includes the secondary winding L2 of the transformer (Tr, 16) that has N2 turns in its secondary winding and the synchronous rectifier (SR, 28).

Figure 15:
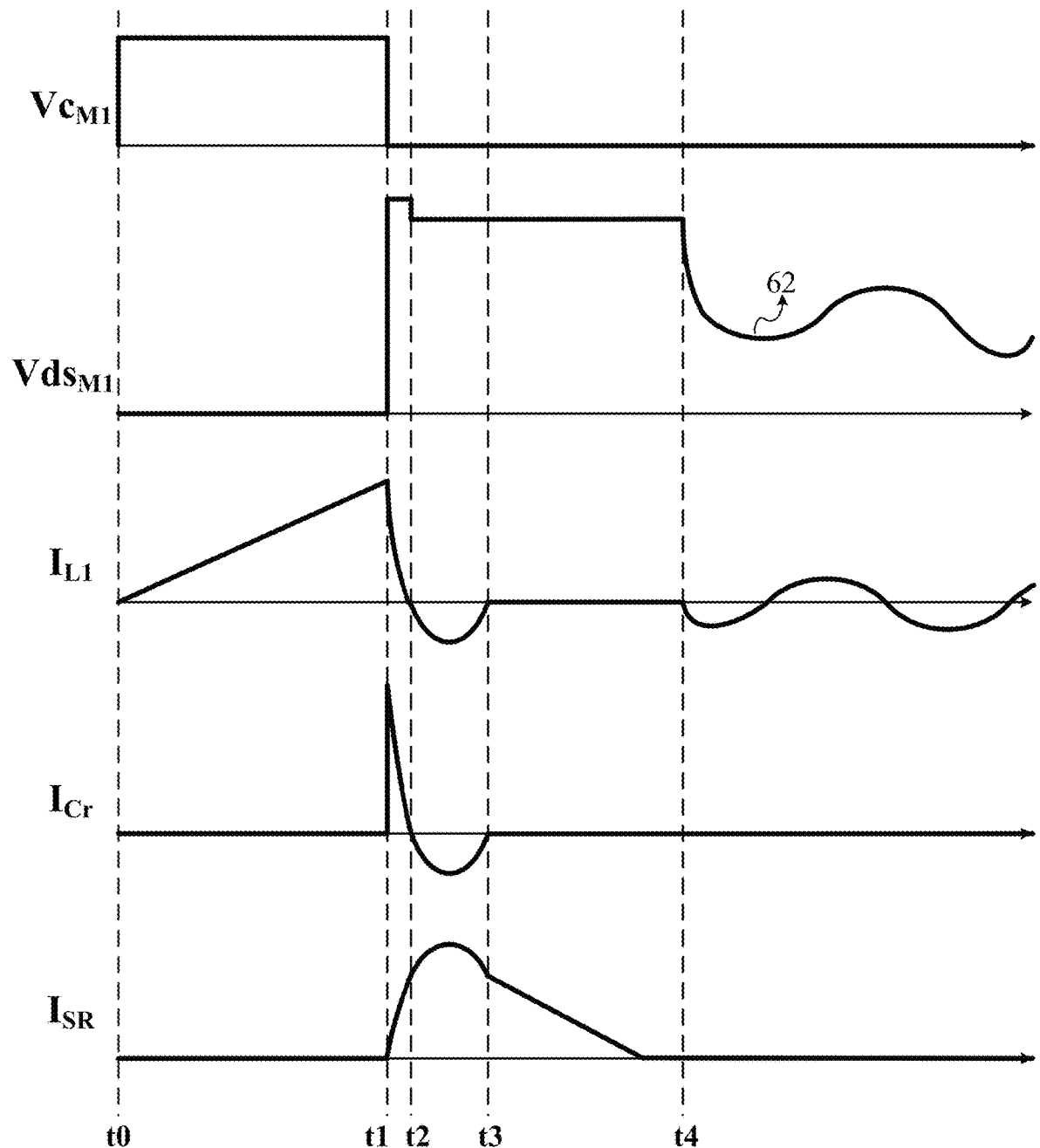
FIG. 15 illustrates waveforms of the flyback converter of FIG. 14.

Key waveforms representing the operation of the circuit 2000 are schematically depicted in FIG. 15. These key waveforms are presented in order from top to bottom and include: 1) the control signal (VcM1, 22) of the main switch M1; 2) the voltage (VdsM1) across the main switch M1; 3) the current IL1 through the primary winding L1 of the transformer (Tr, 16); 4) the current ICr through the clamp capacitor (Cr, 43); and 5) the current ISR through the synchronous rectifier (SR, 28).

With continuing reference to FIG. 15, in operation of the circuitry 2000, in the period between times t0 and t1, the main switch M1 is configured to conduct and the magnetizing current builds up the transformer Tr. At time t1, the main switch M1 turns off (shown as VcM1 reaching zero) and the magnetizing current starts flowing towards the secondary winding (L2, 14) and through the synchronous rectifier (SR, 28). The current flowing through the leakage inductance of the primary side starts flowing though the passive clamp circuit formed by the diode (Dc1, 86) and the clamp capacitor (Cr, 43), and then through the first rectifier (D1, 58) toward the auxiliary energy storage, depicted as voltage source (VB, 60). Unlike in Example 1 showing the traditional or prior art passive clamp, the current from the leakage inductance here is directed towards the voltage source VB, 60.

The key waveforms of FIG. 15 are similar to those presented in FIG. 13. However, in FIG. 15 there is not a control signal for the active clamp switch VcM2. The interval between times t2 to t3 should be smaller than the reverse recovery time trr of the diode (Dc1,86). For a person of skill in the art, the design of high-efficiency passive clamps in which the passive clamp operates in the same way as an active clamp without the need for an additional active clamp switch, has to comply with some boundaries. The reverse recovery characteristics of the diode (Dc1, 86) have to be larger than the time interval between t2 to t3, in all the operating conditions of the flyback converter. To be operational in all such conditions would require that the leakage inductance of the transformer (Tr, 16) be under a certain value for a given power level, and a given turns ratio of the transformer (Tr, 16) and a given value for (VB,60).

Injecting, or delivering, the current through D1,58 into voltage source VB, 60 (auxiliary storage of EM energy) causes a transfer of energy to the voltage source VB, 60 and produces a dumping effect, substantially reducing the ringing in the active clamp portion of the circuitry. In this embodiment, a significant portion of the leakage inductance energy is transferred to the voltage source VB, 60. The interval between times t1 and t2 is a function of the voltage across VB. For larger values of VB, the interval between times t1 and t2 decreases. The voltage across VB is reflected across the voltage across the main switch, as depicted in the Vds M1 line in FIG. 15 (an "overshoot" portion of the curve). A reduction of the duration of the time interval (between t1 and t2) leads to a considerable decrease of the RMS current through clamp circuit formed by (Dc1, 86) and (Cr, 43).

In one implementation, for example, the energy from the leakage inductance (which is harvested/injected in the voltage source VB) is used to provide some or all of the bias power in the flyback converter circuitry. One such embodiment configured to implement this practical situation is presented in the circuit 2300 of FIG. 16. There, as compared with the circuit 2000 of FIG. 14, a bias winding (L3, 166) with N3 turns in the corresponding coil, a synchronous rectifier (SRB, 68), and a bias capacitor (CB1, 72) are included and form an electronic sub-circuit 2310 of the electronic circuitry 2300. In some embodiments, the synchronous rectifier SRB, 68 in the one embodiment can be configured as a simple diode. Based on such arrangements, in cases where the current injected in the bias portion 2310 is larger than the current required by the bias portion, the extra energy is transferred to the secondary side via the synchronous rectifier SRB, 68.

Example 5: Using the Leakage Inductance Energy Via a High-Efficiency Rompower Passive Clamp to Obtain Zero-Voltage Switching Conditions for the Main Switch of the Circuit Building upon the description of Example 4, the harvested energy of the leakage inductance may be re-used to reduce (and even eliminate) one of the largest losses in the flyback type converter, specifically, the switching losses associated with the hard discharge of the parasitic capacitance (Ceq, 20) when the main switch (M1, 28) is turned on. In one example, the circuit 2500 of FIG. 17 achieves this goal: this circuit 2500 harvests, in operation as illustrated schematically in FIG. 17, the leakage inductance energy and uses such energy to discharge the parasitic capacitance of the capacitor Ceq across the main switch M1 in order to create zero voltage switching conditions for the main switch M1.

The embodiment of the circuit 2500 is configured so that the capacitor (Crc, 72) is charged with the harvested leakage inductance energy, and, in operation, the energy from the capacitor (Crc, 72), is used to inject a pulse of current into the transformer (Tr, 16) via the auxiliary (current injection winding 78 with the purpose of discharging the parasitic capacitance (Ceg, 20). Here, the current injection circuit is formed with the use of a current injection winding (Linj, 78), a current injection switch (Minj, 80) such as a Mosfet, controlled by a current injection control signal (VcMinj, 82), and an energy source (represented by charged capacitor Crc).

In addition to the capacitor Crc, in one implementation, an optional smaller capacitor (Cinj, 76) is also added as shown. In this implementation, the capacitance of the capacitor (Cinj, 76) is preferably at least ten times lower than the capacitance of the capacitor (Crc). In between the capacitors (Cinj, 76) and (Crc, 72), there is a diode (Dinj, 74) with its anode connected to the capacitor (Crc, 72). The optional capacitor (Cinj, 76) is charged in forward mode via the winding 78, during the period of conduction of the main switch (M1, 18). The energy in this capacitor (Cinj, 76) is preferably much smaller than the energy coming from the capacitor (Crc, 72). The use of the capacitor Cinj is to shape the current through the current injection switch (Minj, 80) to become negative before the moment of time when the (VcMinj, 80) turns off. In addition, the capacitor Cinj adds energy into the current injection circuit. This current injection method is presented in U.S. patent application Ser. No. 16/503,432 entitled "Self-Adjusting Current Injection Technology," the disclosure of which is hereby incorporated by reference.

Figure 17:
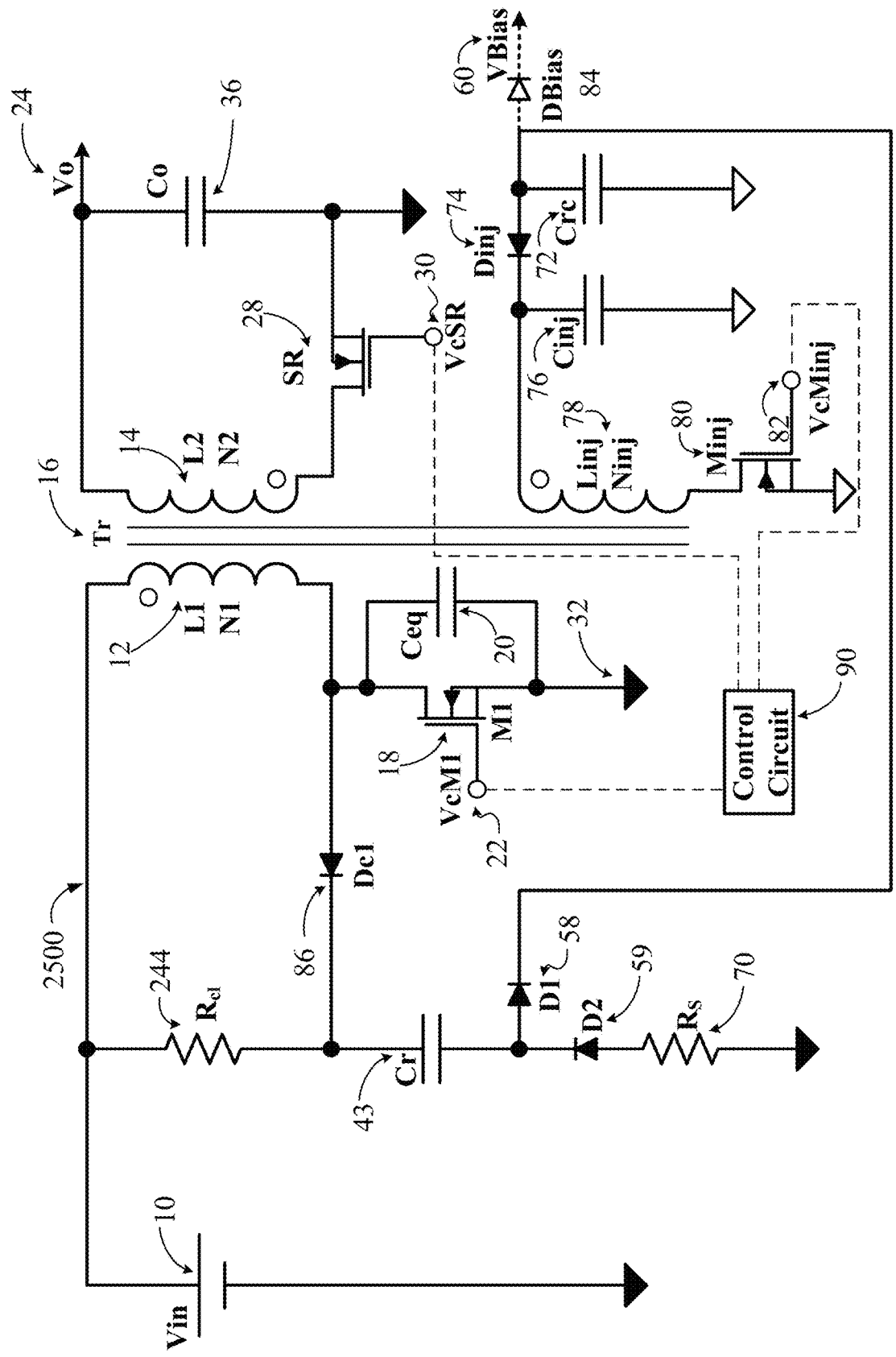
Figure 18:
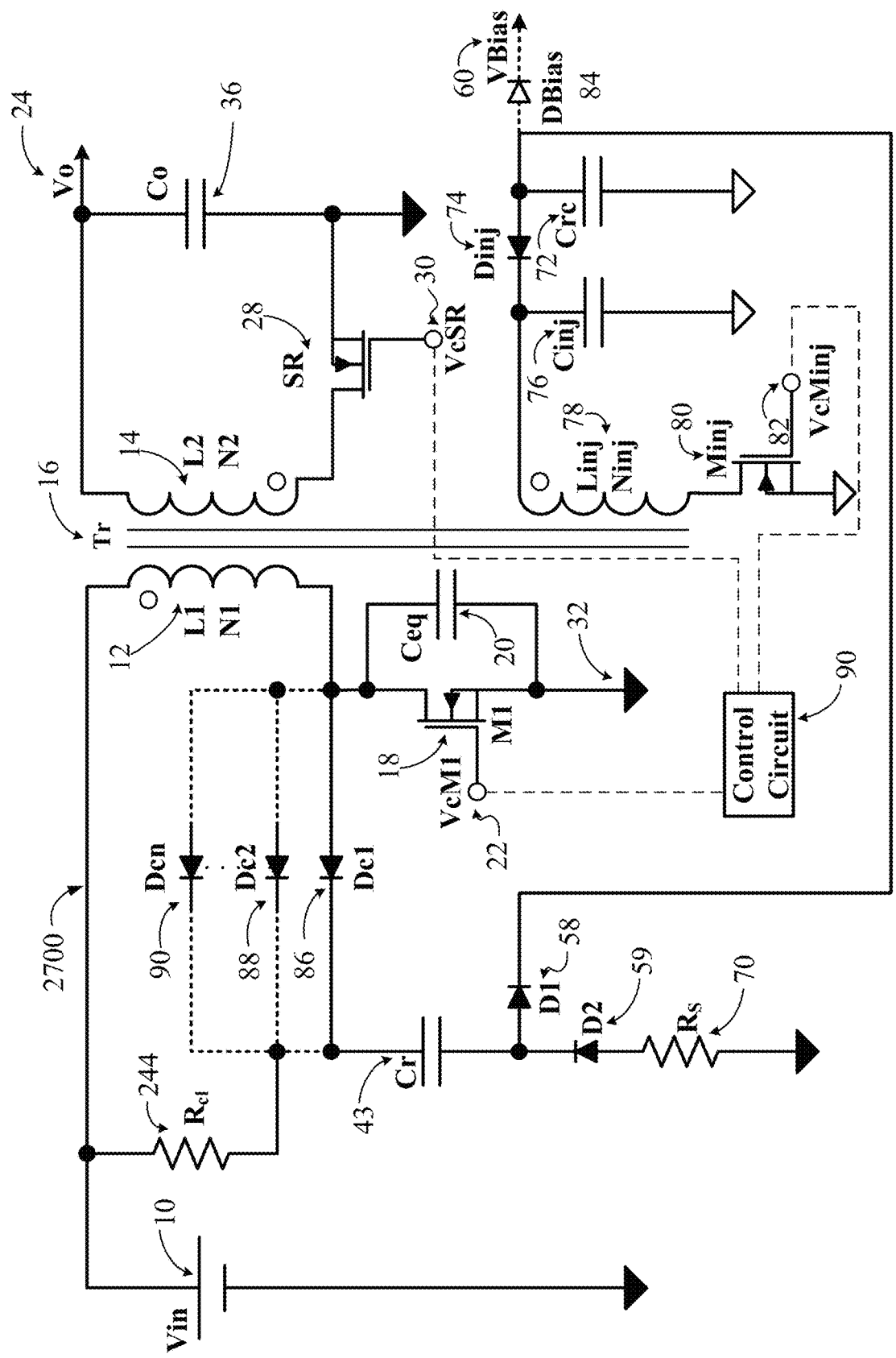

In one embodiment, as illustrated in FIGS. 17 and 18, electronic circuitry has primary and secondary sides and includes: (a) a flyback power converter that includes an input voltage source, a transformer having a primary winding on the primary side and a secondary winding on the secondary side, respectively, a main switch in series with the primary winding on the primary side, a parasitic capacitor across the main switch, and a synchronous rectifier in series with the secondary winding on the secondary side; (b) a passive clamp circuit across the main switch, wherein the passive clamp circuit contains a clamp diode and the clamp capacitor in series with the clamp diode; and (c) a current injection circuit including a current injection winding, a current injection switch connected to a first terminal of the current injection circuit, and a source of energy between a second terminal of the current injection circuit and the found. The current injection circuit is configured, in operation of the electronic circuitry, to collect energy of a leakage inductance of the electronic circuitry and to inject this energy in a form of a pulse of current into the transformer via the current injection winding to discharge the parasitic capacitor to create a zero voltage switching condition for the main switch.

The above electronic circuitry may additionally include an auxiliary circuit that contains two rectifiers connected such that a cathode of a first of the two rectifiers is directly electrically connected with a cathode of a passive clamp circuit at a second node, an anode of a second of the two rectifiers is directly electrically connected with the cathode of the first of the two rectifiers at the second node, and a control switch is connected between the second node and the ground. The embodiment of the electronic circuitry may further include a control electronic circuitry configured to generate a control signal governing an operation of the control switch and electrically connected to each of the main switch, the bias synchronous rectifier, and the control switch. In any implementation, the combination of the flyback converter with the passive clamp (and in absence of the auxiliary circuit) is characterized by a first value of RMS current through the clamp capacitor. In any embodiment, the auxiliary circuit is configured to reduce the RMS current through the clamp capacitor from a first value to a second value, such that the RMS current passing through the clamp capacitor of the electronic circuit has the second value, which is at least 40% lower than the first value. In any embodiment, the clamp diode may be configured: i) to be turned on at a moment of time after the main switch is turned off; and ii) to be turned off at the moment of time prior to the moment of time at which current passing through the secondary winding reaches a zero level. Optionally, the source of energy is configured as a first capacitor, and the current injection circuit additionally includes an injection capacitor in parallel with the first capacitor, to shape, in operation of the electronic circuitry, a current through the current injection switch to become negative before a moment of time when the current injection switch turns off. In at least one implementation, a capacitance of the first capacitor is a least then times higher than a capacitance of the injection capacitor.

Figure 19:
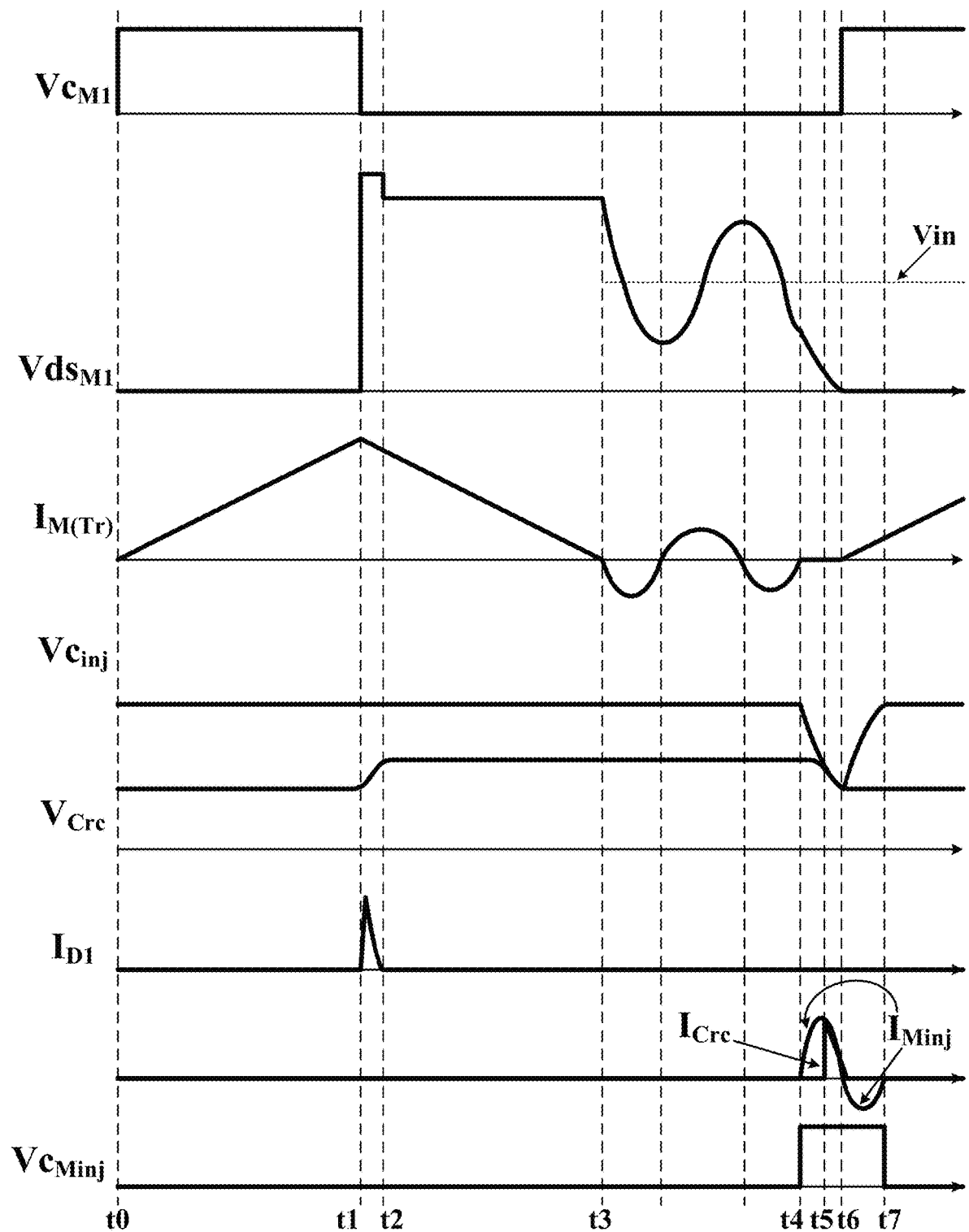
FIG. 19 illustrates waveforms of the flyback converter of FIG. 17.

Key waveforms of the circuit 2500 of FIG. 17 are presented in FIG. 19 in order from top to bottom and include: 1) the control signal (VcM1, 22) for the main switch (M1, 18); 2) the voltage (VdsM1) across the main switch (M1, 18); 3) the magnetizing current Im(Tr) through the transformer (Tr, 16); 4) the voltage VCinj across the capacitor Cinj; and 5) the voltage VCrc across (Crc,72); 6) ID1, the current through the rectifier (D1, 58), 7) the current through the switch (Minj,80) and the current coming from (Crc,72); and 8) the control signal, VcMinj, for the current injection switch.

Considering the operation of the circuit 2500, at the moment t1, the mains switch M1 turns off when the magnetizing current IM(Tr) is at its peak. The current through the leakage inductance continues to flow via (Dc1, 86) and the clamp capacitor Cr, 43) and further through the rectifier D1,58 to charge the capacitor (Crc, 72). The voltage across the capacitor (Crc, 72) increases between the times t1 and t2 (as shown in FIG. 19), with the shape of the waveform VCrc affected by the current passing through D1 being injected in the capacitor Crc.

Between times t2 and t3, the energy contained in the magnetizing current of the transformer (Tr, 16) is transferred to the secondary side via (SR, 28) and then stored in capacitor (Co, 36). After time t3, the primary inductance of the transformer (Tr, 16) starts oscillating with the capacitor Ceq,20, as shown by the curve VdsM1 representing voltage across the main switch M1.

At time t4 (which time coincides with the valley of such oscillation), the switch Minj is turned on by the control signal (VcMinj, 82). When the current injection Mosfet (Minj, 80) is turned on, the capacitor (Cinj, 76) starts to discharge and the current through the switch Minj increases. The leakage inductance of the transformer forms a resonant circuit with the capacitor (Ceq, 20), and the current through Minj is substantially sinusoidal. The voltage across (Cinj, 76) decays until it reaches the voltage level across Ccr at the time t5.

After time t5, the current injection is provided by the energy contained in the capacitor Crc (in parallel with Cinj, in this example). As described above, it is preferred that the capacitance of Cinj be much smaller than the capacitance of the Crc (one-tenth in value or even smaller), in which case, after time t5, most of the energy is delivered from the capacitor Crc.

At time t6, the current injection current (that is, the current through Minj) reaches zero. After time t6, the current through Minj becomes negative, because it flows into the Cinj capacitor charging it between the times t6 and t7, when both the main switch M1 and the current injection switch Minj are on. At time t7, the current injection switch Minj is turned off by the control signal VcMinj.

The current injection circuit 2700 depicted in FIG. 18 is also operational without the capacitor Cinj. The role of the capacitor Cinj is not essential to the performance of this circuit 2700, because most of the energy is delivered from the capacitor Crc, energy which comes from the leakage inductance energy of the transformer (Tr, 20).

In the circuit 2500 of FIG. 17, the amplitude of the current injection is a self-adjusting function of the voltage across the main switch when Minj is turned on. The current injection circuit the voltage across Crc does not change significantly. The current injection amplitude is a function of the voltage across the main switch M1 at the time when the current injection turns on. For low voltage across the main switch, the amplitude of the current injection is small. If the voltage across the main switch is high when the current injection turns on, then the amplitude of the current injection will be high. If the voltage across M1 is small (such as in the case of the lowest point of the valley), the amplitude of the current injection will be small, and if the turn "on" of Minj occurs at a higher input voltage across M1, the amplitude of the current injection will increase.

As depicted in FIG. 19, the voltage across M1 decays as a result of the discharge of parasitic capacitance (Ceq, 20) by the current injection through Minj reflected into the primary winding 12. At t6, the voltage across M1 is zero, which creates zero voltage switching conditions for M1.

In contradistinction with the circuitry of related art, where the leakage inductance energy is dissipated and there is additional dissipation of energy contained in the parasitic capacitance (Ceq, 20), in this embodiment, the leakage inductance energy is used to discharge the parasitic capacitance (Ceq, 20) and create zero voltage switching conditions for M1.

In the event the injection current is small (because the voltage across M1 is low when the Minj is turns on), the energy injected into the capacitor (Crc, 72) is higher than the energy taken out through the current injection. A diode (Dbias, 84) is placed between Crc and the bias circuit to allow the extra energy from the leakage inductance to be used for the bias utilization.

Figure 16:
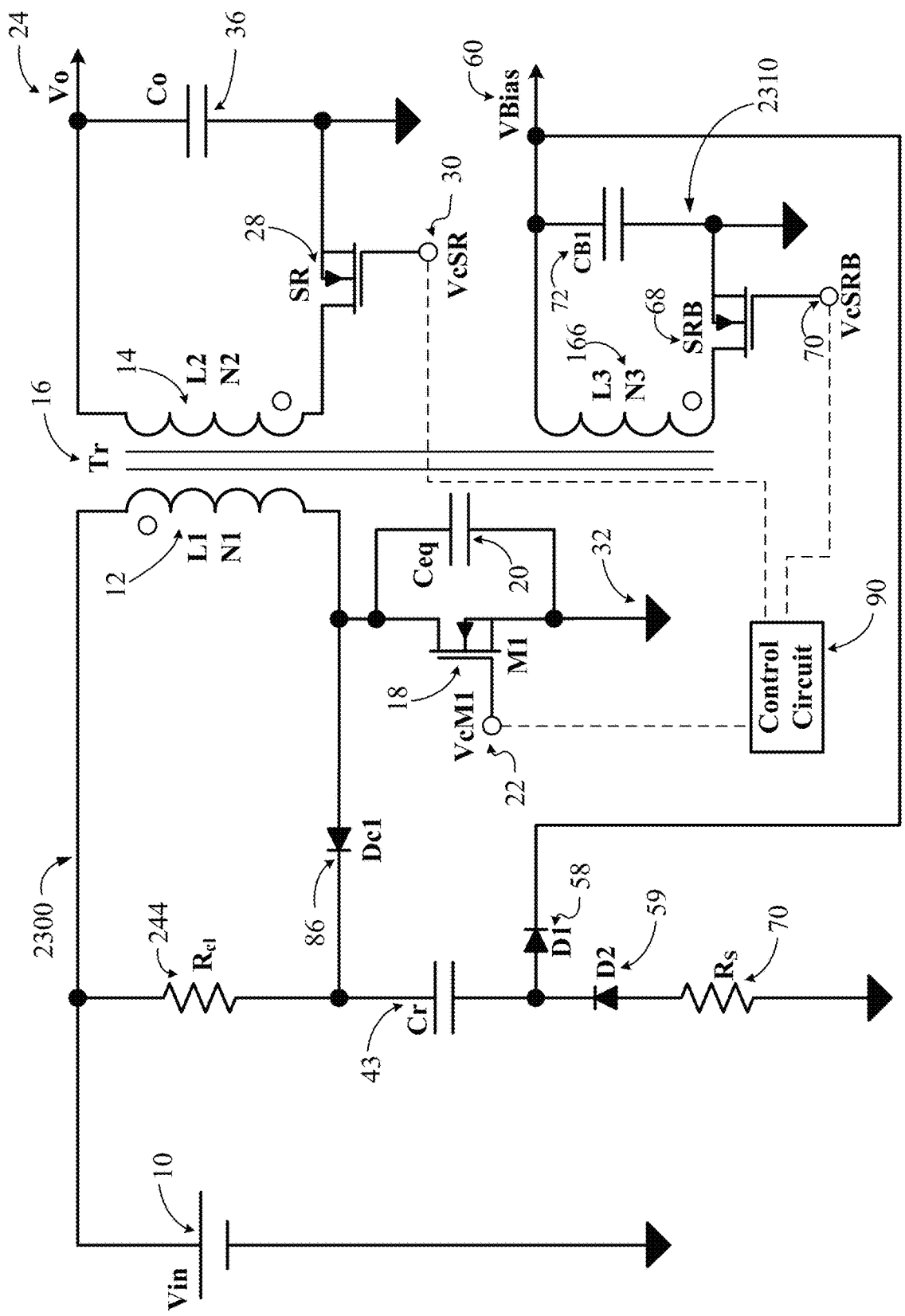
FIGS. 16-18 are schematic of a different flyback converters, each with a passive clamp.

In the high-efficiency passive clamp depicted in FIGS. 14, 16, and 17, the clamp diode is formed by only one diode. However, FIG. 18 shows the clamp diode formed by several diodes in parallel (Dc1, Dc2, . . . Dcn), which brings several additional benefits. One benefit is the distribution of the leakage inductance current through each diode which reduces the dI/dt through each diode and reduces the amplitude of the forward voltage across the diode due to the forward reverse recovery characteristics of the diodes. In addition, the charge in the junctions of all the diodes is increased, which allows better operation of the high-efficiency passive clamp in marginal conditions when the leakage inductance in the transformer is higher or when the amplitude of the magnetizing current is higher.

Accordingly, there is a method for operating the electronic circuit 2500 of FIG. 17. Such method includes the steps of: (a) turning the main switch off at time t1, when a magnetizing current of the transformer is at a peak reached during a period of conduction of the main switch; (b) between times t1 and t2, charging the source of energy (Crc,72), with a current from a leakage inductance of the electronic circuitry that has passed through the passive clamp and through the second of the two rectifiers, to increase a voltage across the source of energy; and (c) transferring energy contained in the magnetizing current to the secondary side via the synchronous rectifier to store the energy in an output capacitor disposed between the ground and a terminal of the secondary winding, so as to harvest energy of leakage inductance of the electronic circuitry and the use the energy to discharge the parasitic capacitor to crease zero-voltage switching conditions for the main switch. In some operational embodiments, the method additionally includes the step of, at time t3 (after t2), having a substantially constant voltage across the main switch changed after time t2 to an oscillating voltage and then turning the current injection switch on at the valley at time t4. In any implementation, the method may also include the following steps: after the current injection switch has been turned on, discharging the source of energy to shape a current passing through the current injection switch to be substantially sinusoidal, and switching off the current injection switch at a moment when the current passing through the current injection switch is negative or substantially zero. The switching off may include switching off the current injection switch after a moment when the current passing through the current injection switch became negative.

Figure 20:
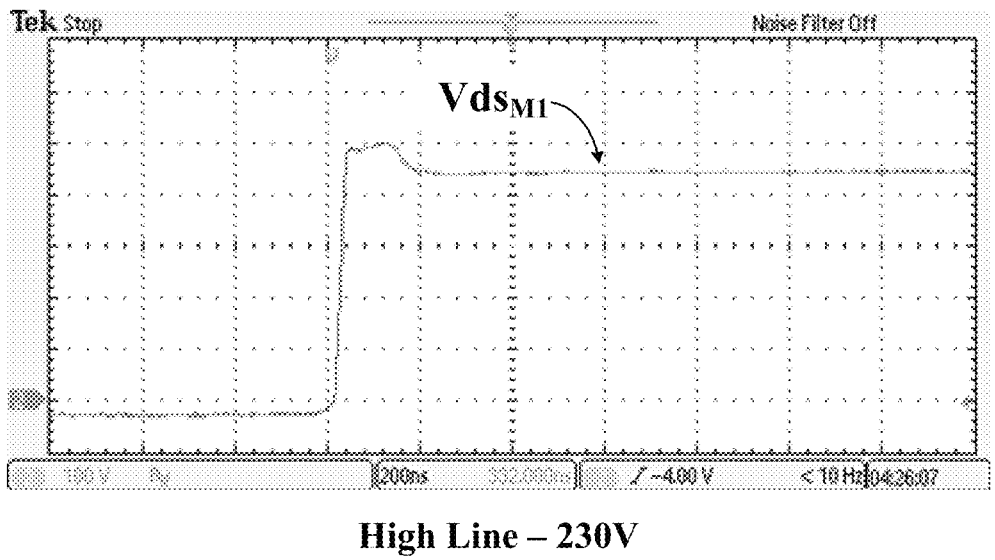
FIG. 20 illustrates waveforms across a main switch of the flyback converter of FIG. 17 at different input voltages.
Figure 20:
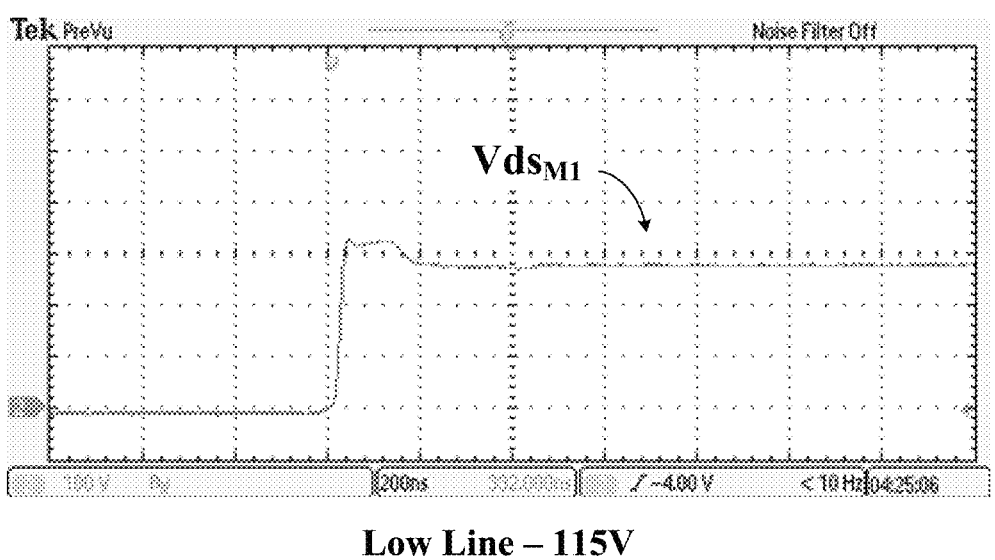

FIG. 20 depicts two experimental waveforms of the voltage across the main switch of the circuit 2500 of FIG. 17. The plot at the top of the page illustrates the voltage across the main switch (M1, 318) when the input voltage Vin, 10 is 115 volts AC. The plot at the bottom of the page illustrates the voltage across the main switch (M1, 318) when the input voltage Vin, 10 is 230 volts AC. As can be seen, in both input voltage scenarios, use of the passive clamp eliminates spikes and ringing across the main switch (M1, 138) when the main switch is turned off.

Figure 21:
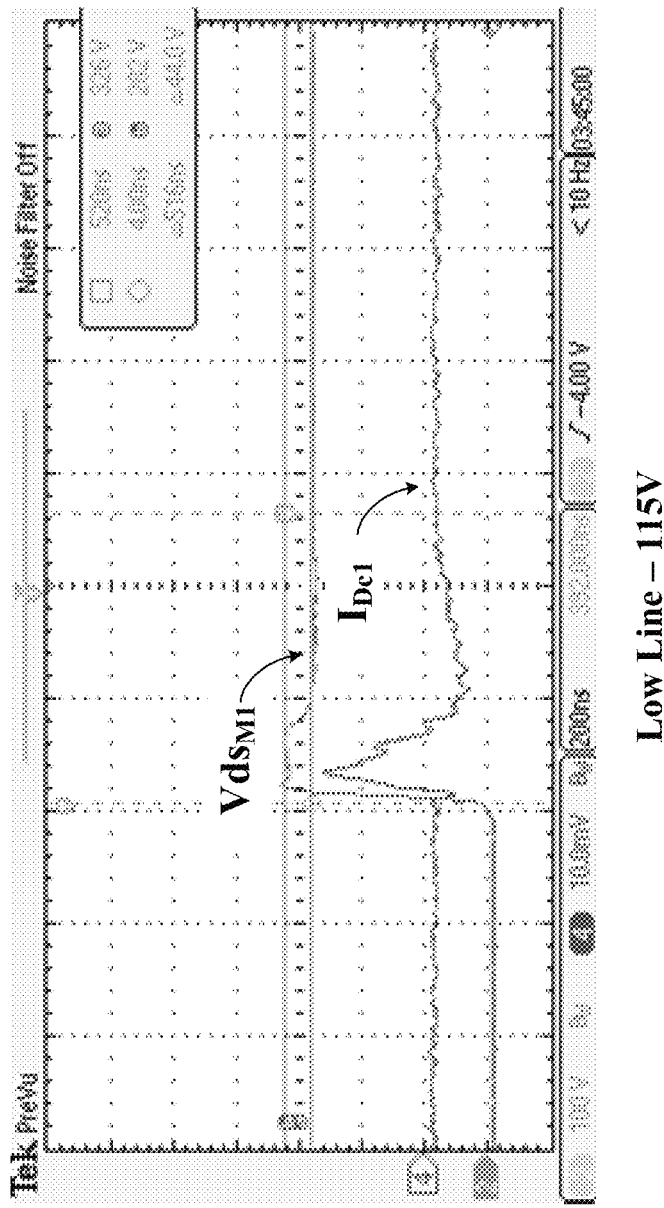
FIG. 21 illustrates waveforms of voltage across the main switch, and current through the passive clamp, of the flyback converter of FIG. 17.

FIG. 21 depicts an experimental waveform of the voltage VdsM1 across the main switch (M1, 318) of the circuit 2500 of FIG. 17 when the input voltage is 115 volts AC. On the same plot, FIG. 21 depicts an experimental waveform of the current IDc1 through the passive clamp of the circuit 2500, also when the input voltage is 115 volts AC.

Example 6: Applications Other than Flyback Topology

Figure 22:
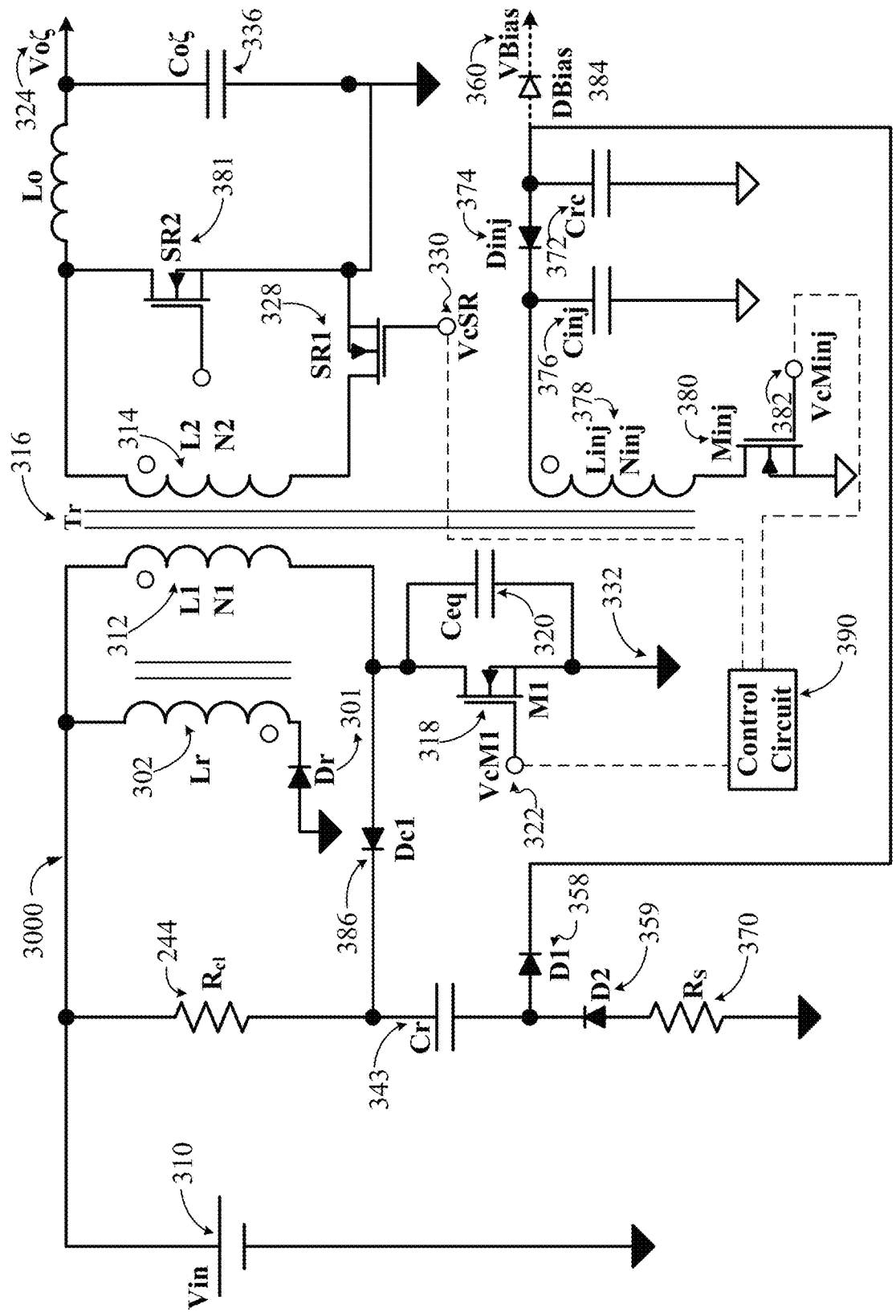
FIG. 22 is a schematic of an exemplary application of a flyback converter.

The embodiments presented herein can be applied to many other circuits besides the flyback topology. FIG. 22 presents an example within a forward topology in which the reset of the transformer is done through an auxiliary winding. It uses only one power switch in the primary such as the flyback topology. The reset of the transformer is done with an auxiliary winding. The number of turns in the auxiliary winding (LR, 302) is equal to the number of turns in the primary of the transformer, (L1, 312) and the voltage across the main switch (M1, 318) at turn off reaches an amplitude of 2*Vin. By tailoring the number of turns in the auxiliary winding versus the number of turns of the winding in primary, the voltage across (M1, M1) can be higher than 2*Vin and, as a result, the maximum duty cycle can be higher than 50%.

Figure 23:
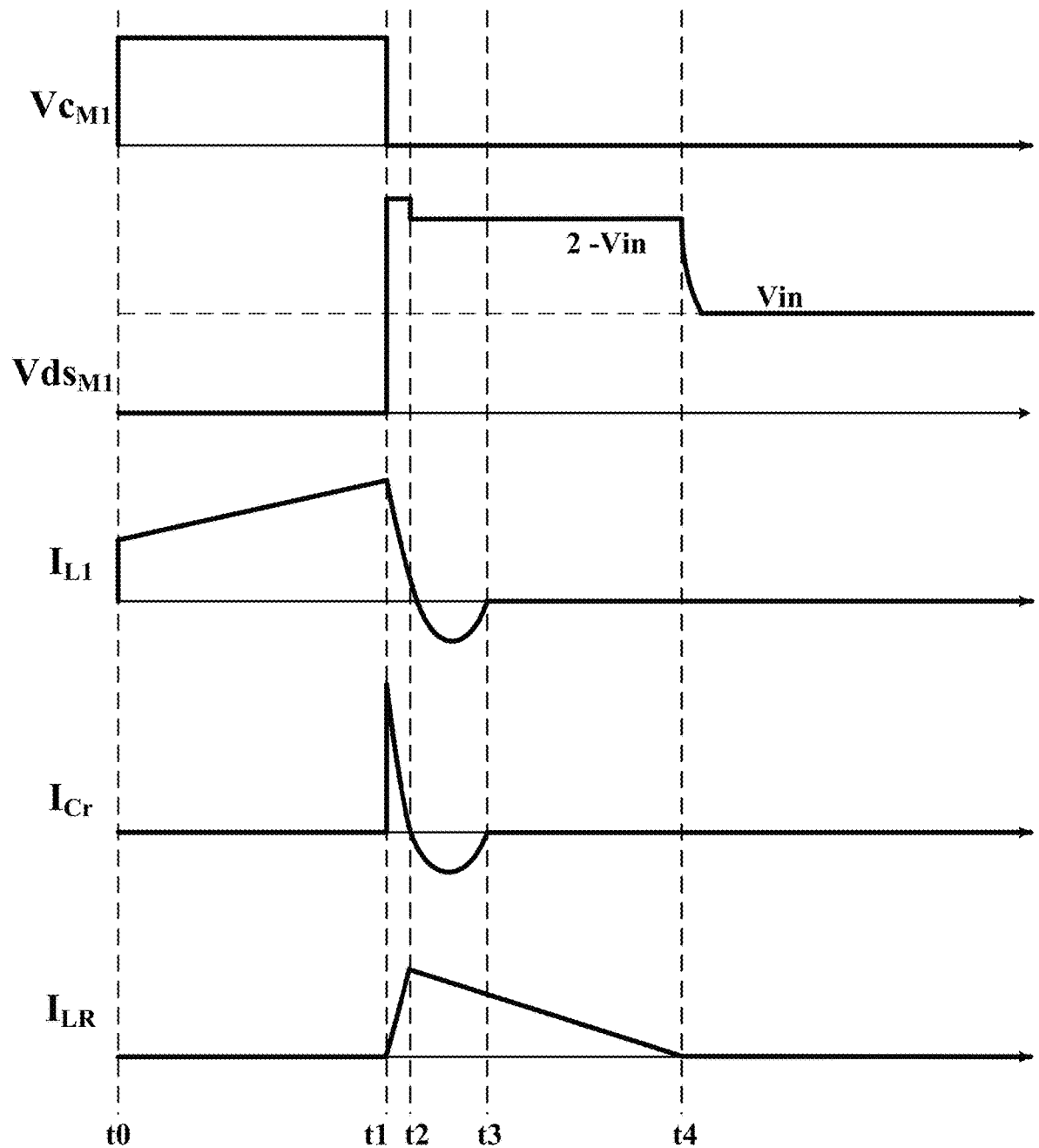
FIG. 23 illustrates waveforms of the flyback converter of FIG. 22.

FIG. 23 depicts the key waveforms of this topology. These include, in order from top to bottom: 1) the control signal (VcM1, 322) for the main switch (M1, 318); 2) the voltage (VdsM1) across the main switch (M1, 318); 3) the current IL1 through the primary winding of the transformer (Tr, 316); 4) the current ICr through the clamp capacitor (Cr, 343); and 5) the current ILR through the reset winding (LR, 302).

Between times t0 and t1, the current flows from the primary winding in a forward mode towards the secondary winding via, SR1 and Lo to the output. At time t1, the main switch (M1, 318) turns off. The current through the leakage inductance will start flowing via diode (Dc1, 386), clamp capacitor (Cr, 343) and diode (D1,358) charging the capacitor (Crc, 372).

At time t2, the current through the diode (Dc1, 386) reaches zero and reverses its polarity, conducting in reverse through the diode Dc1, due to its reverse recovery characteristics. The reverse charge flowing through the diode (Dc1, 386) is equal with the forward charge injected in the clamp capacitor (Cr, 343). The reverse charge is smaller than reverse recovery charge of (Dc1, 386). If the above condition is met, then the simple diode (Dc1, 386) operates as an active clamp and the energy from the leakage inductance of the transformer (Tr, 316) is partially transferred to the secondary winding and further via (Lo,337).

At time t3, all the charges at the junction of the diode (Dc1, 386) are depleted and the diode (Dc1, 386) becomes a high impedance device. Further the magnetizing current will flow via the reset winding (LR, 302) until the magnetic core of the transformer (TR,316) is completely reset at time t4.

As seen in FIG. 23, the voltage VdsM1 spikes across the main switch when the main switch turns off. This occurs when the embodiments disclosed herein are not used. With those embodiments, the leakage inductance energy is partially recycled and some of it is used to charge (Crc,372) to be further used to energize the current injection circuit and obtain zero voltage switching conditions across the main switch, when the main switch is turned on.

Another application of this embodiment is for the active forward with active clamp topology wherein the sub circuit formed by the clamp switch connected in series with the clamp capacitor is not placed across the main switch or across the primary winding but is instead connected across an auxiliary winding. This active clamp forward topology contains a main switch and a clamp switch which is complementary to the main switch and a clamp capacitor in series with the clamp switch. The sub circuit formed by the clamp switch in series with the clamp capacitor is generally connected across the main switch, or it may be connected across the primary winding. The clamp switch is on when the main switch is off and the clamp switch is off when the main switch is off. The advantage of this topology is that the reset of the transformer occurs during the entire off time of the main switch and, as a result, the voltage across the main switch is minimized for a given duty cycle of operation. In addition, the flux through the transformer is symmetrical to zero which leads to better utilization of the magnetic core of the transformer. One disadvantage of this topology for high voltage input application is that it requires another high voltage switch which is the clamp switch. Further, a high voltage floating drive is required to control the active clamp switch while the main switch is driven from the ground level. One solution to avoid this complexity and cost is to place the clamp switch in series with the clamp capacitor across an auxiliary winding. In such case, by choosing the right number of turns in the auxiliary winding, the clamp switch can have a lower voltage rating. In addition, the clamp switch can be driven from the ground level.

Connecting the sub circuit formed by the clamp switch in series with the clamp capacitor across an auxiliary winding is one solution, but the leakage inductance in between the primary winding of the transformer and the auxiliary winding will create voltage spikes across the main switch, as is the case of the single switch forward topology depicted in FIG. 22 in the event the passive clamp claimed in this application is not used. A passive clamp such as the one presented in FIG. 14 can be used across the main switch. The passive clamp would be formed by Dc1, Cr, D1, D2, Rs and a voltage source VB which can be the bias power of the converter. In some applications, the diode D1 can be connected to the current injection circuit, as depicted in FIG. 22. By using the passive clamp circuit and the method presented herein, the active clamp forward topology can be implemented in a very simple way to eliminate voltage stress associated with the spikes and glitches across the main switch due to the leakage inductance in between the primary winding and the auxiliary winding.

The embodiments disclosed herein can apply to any circuit containing an input voltage source connected to a transformer primary winding, where the transformer contains other additional windings and there is a leakage inductance between the primary winding and the additional winding(s). The circuit would further contain a main switch in series with the transformer primary winding, wherein the magnetizing current of the transformer has a low impedance path to further circulate after the main switch turns off. The circuit would also include a passive clamp formed from a diode and a capacitor in series, where the passive clamp is further connected to an energy extraction circuit that includes two additional rectifiers connected in series with one another and in series with an electronic component configured to store electromagnetic energy, and wherein a cathode of the first of the two additional rectifiers is directly electrically connected with the passive clamp circuit, and wherein an anode of the second of the two additional rectifiers is directly electrically connected with the cathode of the first of the two additional rectifiers, and wherein a cathode of the second of the two additional rectifiers is directly electrically connected with a first terminal of the electronic component, and wherein a second terminal of the electronic component is electrically connected with the anode of the first of the two additional rectifiers. This concept applies to any other topology with leakage inductance in the transformer.

For example, in a flyback topology, the magnetizing current has a low impedance path to circulate after the main switch turns off; this is the secondary winding of the transformer. In the forward topology, with the reset through the third winding, the low impedance path for the magnetizing current after the main switch turns off is through the rest winding.

Example 7: Applications as a Snubber

The embodiments described herein can be applied to many other applications, such as snubber circuits in DC-DC converters. In DC-DC converters, abrupt voltage changes can result in transient ringing in the primary and circuit of a transformer. The leakage inductance of the transformer may interact resonantly with the reverse recovery characteristics of the diode(s) or with the junction capacitance of the diodes and other parasitic capacitance in the circuit. That will lead to large spikes and ringing across the diodes. That may require larger voltage diodes for which some of the key characteristics will be sacrificed, such as the voltage drop.

Figure 24A:
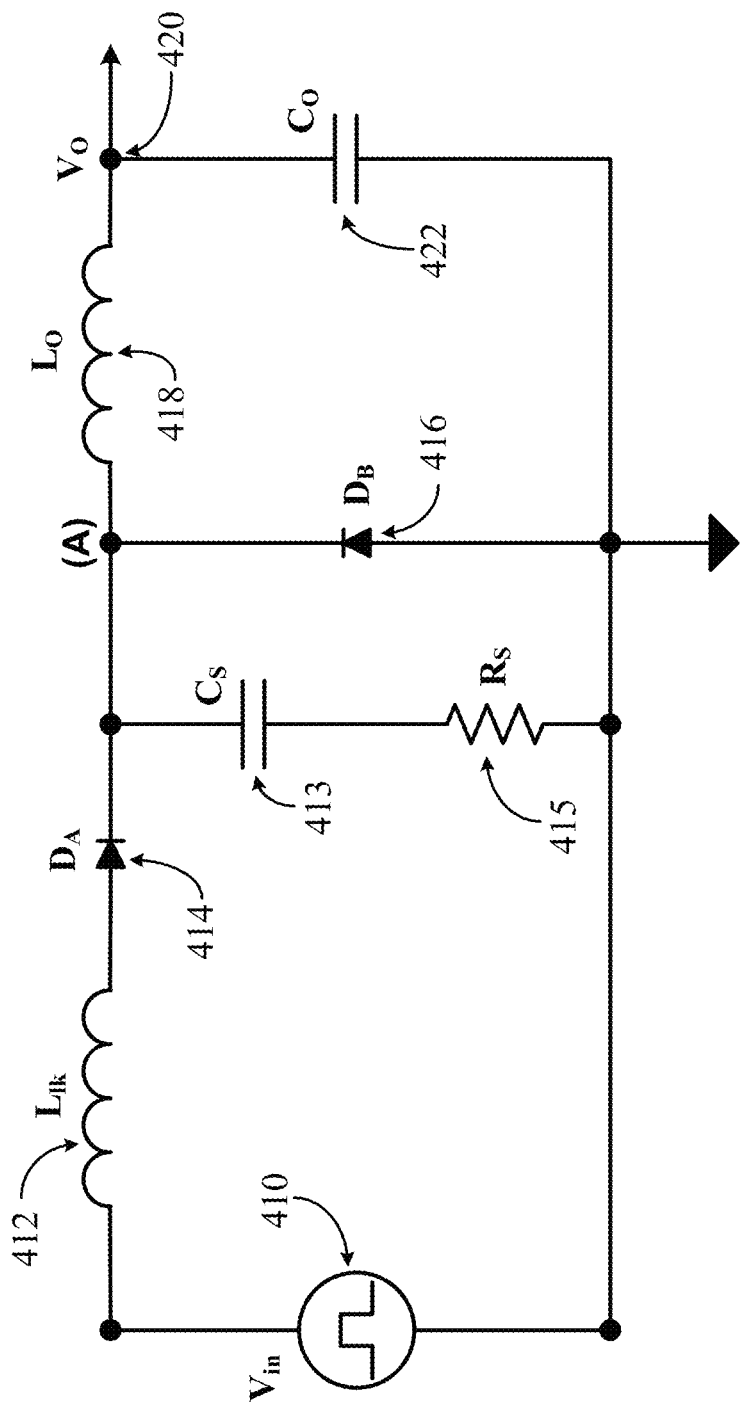
FIG. 24A is a schematic of a prior art implementation of an RC snubber.
Figure 24B:
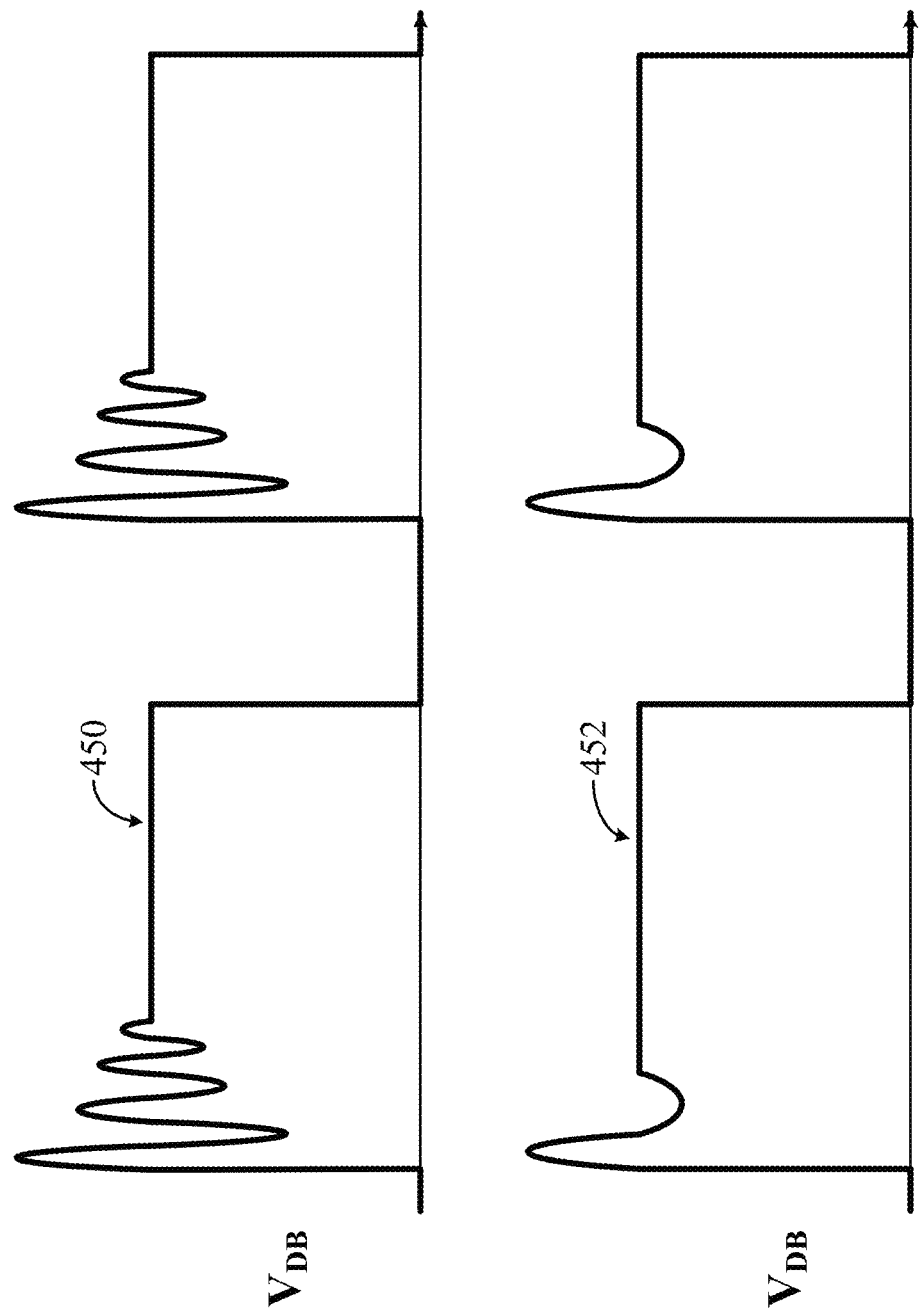
FIG. 24B illustrates a voltage across a diode in the RC snubber of FIG. 24A.

FIG. 24A illustrates the most common prior art solution to suppress the voltage spikes across the rectifiers, namely, using a typical RC snubber. The RC snubber is formed by a capacitor (Cs,413) and a resistor (Rs,415). FIG. 24B presents the voltage across the diode (DB,416) without an RC snubber as the waveform 450, and the voltage across (DB, 416) with an RC snubber as the waveform 452. The problems with the RC snubber are that the first spike does not attenuate as much and that this snubber technique is dissipative, negatively impacting the efficiency of the DC-DC converter. To further improve the snubber technology, active snubbers were introduced.

Figure 25A:
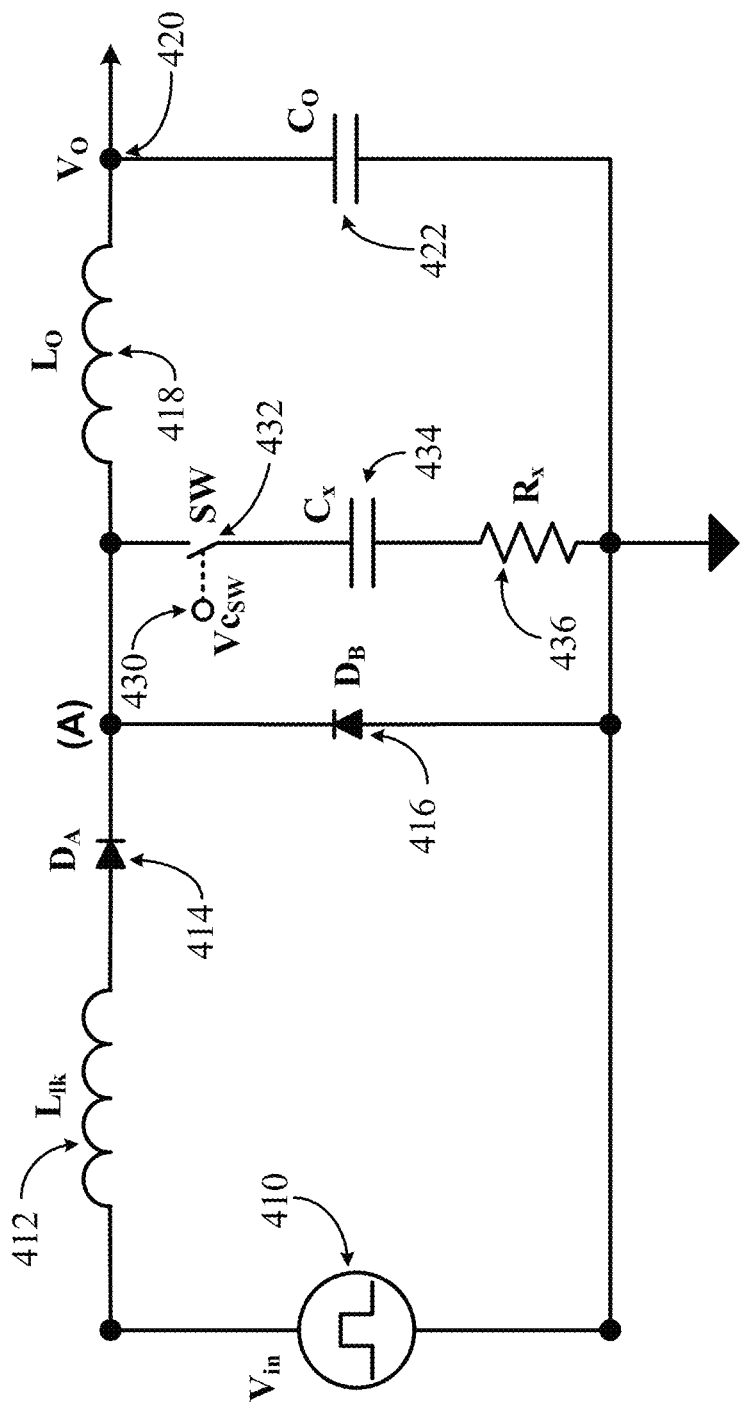
FIG. 25A is a schematic of a prior art implementation of an RC snubber.

This snubber technology is presented in FIG. 25A. A controlled switch (SW,432) is introduced in series with an RC snubber network formed by (Cx,434) and (Rx,436). The current path to the capacitor (Cs,434) is interrupted by the switch (SW, 432) before the capacitor (Cx, 434) discharges and thereafter at each such voltage change at each cycle, the capacitor (Cx,434) is no longer charged from its totally discharged state but nevertheless damps the ringing. This snubber technique is more efficient and also attenuates the first spike more effectively. FIG. 25B presents several key waveforms associated with this snubbing technique. The voltage $v_{(A)}$ in the switch node (A), which represents the voltage across (DB, 416), is depicted by the waveform 454. The voltage Vcs across (Cx, 434) is depicted by waveform 456. As can be seen, the voltage across the snubber capacitor (Cx, 434) is not discharged to zero at each cycle, as occurs in the standard RC snubber of FIG. 24A. Though this snubbing technique is more effective in the attenuation of the first spike and also very efficient, it is relatively complex because it requires a control signal, 430, to timely control the switch (SW, 432).

Figure 26A:
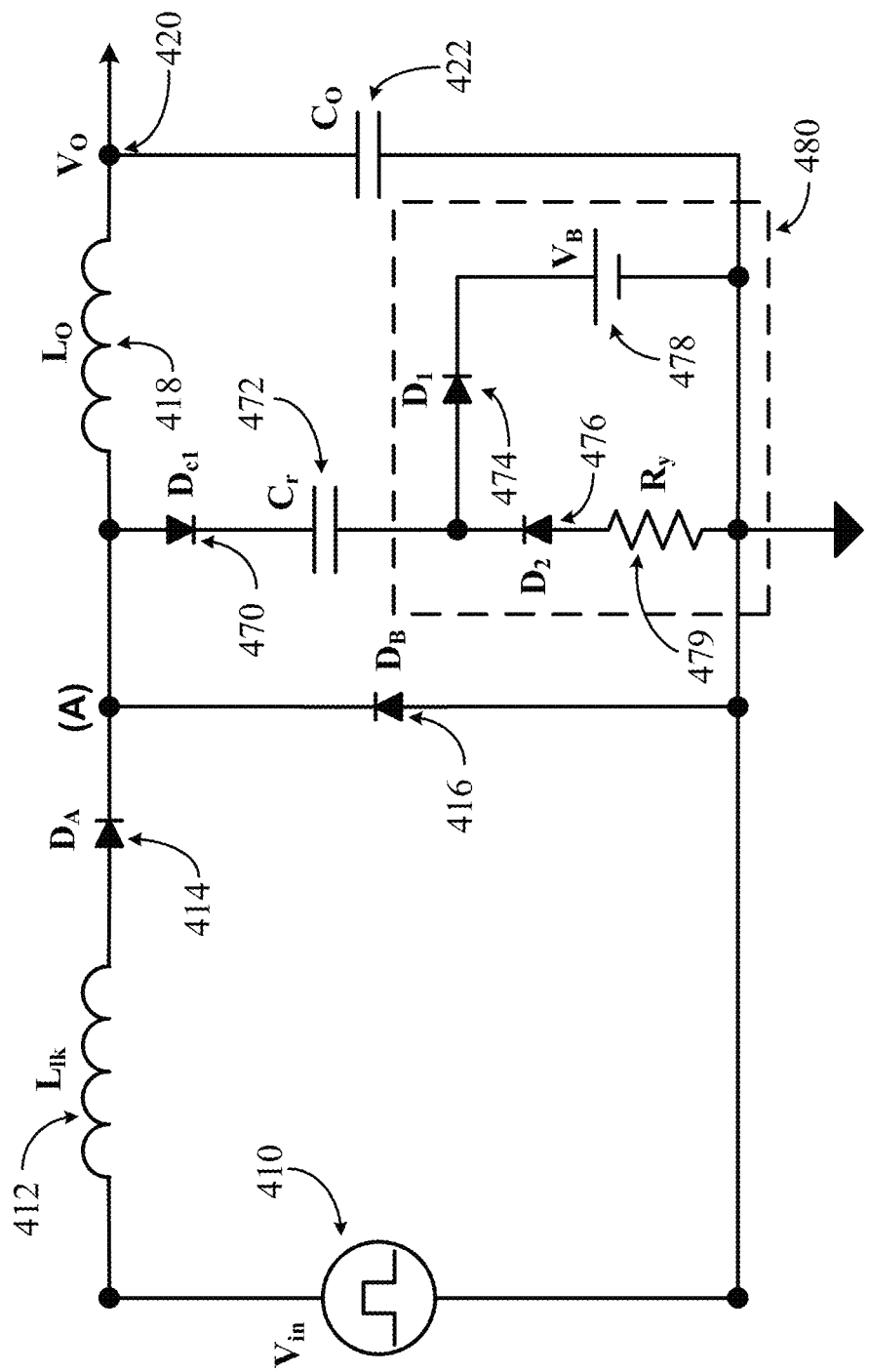
FIG. 26A is a schematic of an implementation of an RC snubber.
Figure 26B:
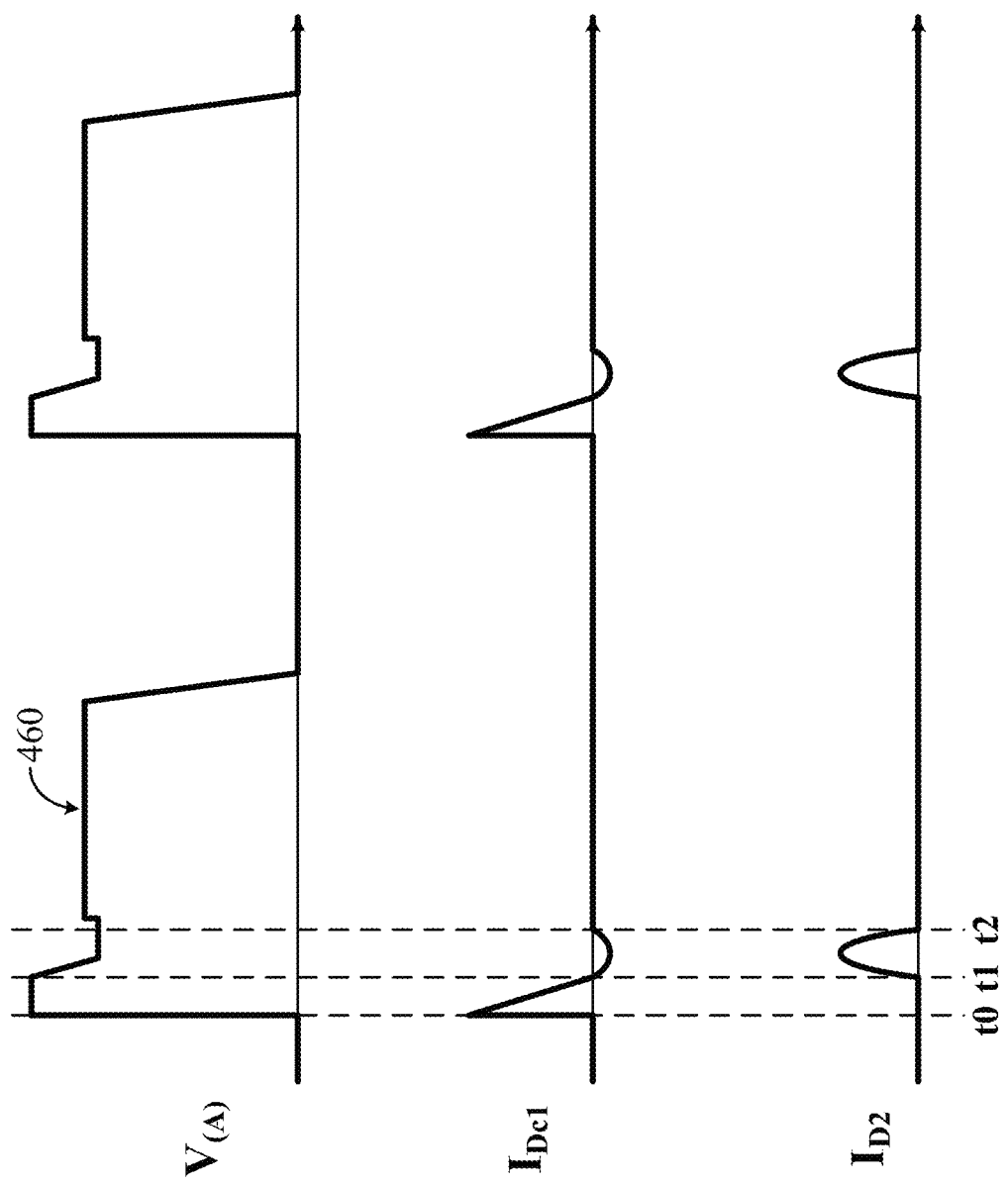
FIG. 26B illustrates voltages in elements of the RC snubber of FIG. 26A.

The embodiments can be used very effectively in a passive snubber as depicted in FIG. 26A. The passive snubber shown there is a passive clamp circuit known as a Rompower Passive Clamp or Rompower Passive Snubber. The passive snubber of FIG. 26A includes a diode (Dc1,470) with a large reverse recovery time and soft reverse recovery characteristics, and a capacitor (Cr, 472) in series with an auxiliary or energy extraction circuit 480. The energy extraction circuit 480 is an electronic component including two diodes (D1, 474) and (D2, 476) which are in series with the resistor (Ry, 479) and a voltage source (VB, 478) placed in the cathode of (D1, 474). FIG. 26B presents some of the key waveforms of the clamp circuit of FIG. 26A. At time t0, the voltage in (A) rises rapidly, caused by the increase of the voltage of (Vin, 410). The current I(Dc1) flows through (Dc1, 470), the capacitor (Cr, 472) and the diode (D1, 474), thereby injecting current in the voltage source (VB,478). Between times t0 and t1, a portion of the energy from the leakage inductance (Llk,412) is transferred to the voltage source (VB,478). Between times t1 and t2, the current through diode (Dc1, 470) will flow in reverse due to the reverse recovery characteristics of the diode (Dc1, 470). The reverse flow of the current is done via the diode (D2, 476) and resistor (Ry, 479) and through the capacitor (Cr, 472) to extract the charge in the capacitor (Cr, 472) which was charged during the time t0 to t1 period. During that period of time between t1 and t2, a portion of the energy from the leakage inductance (Llk, 412) is delivered to the output, to (Lo,418), via reverse recovery of (Dc1,470) (Lo,418) which decreases the current flowing from the input voltage source (Vin, 410) via (DA, 414). The damping of the ringing across (DB,416) is due to the energy extraction circuit 480, which takes the ringing energy and transfers it into the auxiliary energy storage (VB,478). VB can be the bias voltage of the DC-DC converter which incorporates the circuit from FIG. 26A. This snubber technique is a lossless snubber technique because the damping effect is not through power dissipation but through energy extraction, wherein the ringing energy is used for other power needs in power conversion such as bias power. In some applications, diode Dc1 in FIG. 26A can be eliminated and replaced by a short. In such case the energy from the leakage inductance contained in Llk, 412, is transferred to the voltage source VB via the clamp capacitor Cr and the diode D1. Cr is then directly connected to the node (A) at the cathode of DA and DB. This snubber technique works by extracting the energy from the leakage inductance, Llk, 412, and transferring it to the voltage source VB. The clamp capacitor Cr will be recharged when the voltage in the node A swings to a lower voltage during the conduction of the diode DB. The elimination of the diode Dc1 simplifies the circuit and eliminates restrictions associated with the reverse recovery of Dc1, 470. The snubber circuit formed by just Cr, D1, D2, Ry and VB and without the diode Dc1 is another embodiment. The elimination of the ringing and spikes in the node A is done by extracting the energy from the leakage inductance Llk, 412 and transferring this energy to the voltage source VB. VB in this case can be the bias supply or can supply the energy for the current injection circuit or any other applications. Extracting the energy form the parasitic elements such as the energy from the leakage inductance and using it for other purposes such as the bias supply is a very efficient way of eliminating ringing and spikes across the switch elements. The diodes DA and DB in many applications are substituted by Mosfets which will work as synchronous rectifiers, and the snubber circuit described herein will work in the same way.

The inventions as recited in claims appended to this disclosure are intended to be assessed in light of the disclosure as a whole, including features disclosed in prior art to which reference is made.

For the purpose of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to the specified characteristic or quality descriptor means "mostly", "mainly", "considerably", "by and large", "essentially", "to great or significant extent", "largely but not necessarily wholly the same" such as to reasonable denote language of approximation and describe the specified characteristic or descriptor so that its scope would be understood by a person of skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The term substantially equivalent is used in the same fashion.

The use of these terms in describing a chosen characteristic or concept neither implies nor provides any basis for indefiniteness and for adding a numerical limitation to the specified characteristic or descriptor. As understood by a person of skill in the art, the practical deviation of the exact value or characteristic of such value, element or property from that stated falls and may vary within a numerical range defined by an experimental measurement error that is typical when using a measurement method accepted in the art of such purposes.

A preferred embodiment is fully and clearly described above so as to enable a person of skill in the art to understand, make, and use the same. A person of skill in the art will recognize that modifications may be made to the description above without departing from the spirit of the invention, and that some embodiments include only those elements and features described, or a subset thereof. To the extent that modifications do not depart from the spirit of the invention, they are intended to be included within the scope thereof.

The invention claimed is:

1. A DC-DC converter comprising:
an input voltage source in series with a parasitic inductance, wherein a voltage of the input voltage source changes sufficiently abruptly to cause resonant ringing, wherein the input voltage source is connected to a rectifier means which is connected to an output circuit;
a passive clamp circuit across the rectifier means, wherein the passive clamp circuit comprises a clamp diode, a clamp capacitor, and an auxiliary circuit, said auxiliary circuit comprising first and second rectifiers in series with each other and in series with an electronic component configured to store electromagnetic energy, the electronic component having first and second terminals;
wherein an anode of the first rectifier is connected with the clamp capacitor, and a cathode of the first rectifier is connected to the second terminal of the electronic component;
wherein a cathode of the second rectifier is connected with the anode of the first rectifier, and an anode of the second rectifier is connected with the first terminal of the electronic component; and
wherein directing a current, flowing through a leakage inductance, to flow through the clamp capacitor and through the first rectifier toward an auxiliary energy storage, causes some of a leakage inductance energy to transfer to the auxiliary energy storage and damps the resonant ringing.

2. The DC-DC converter of claim 1, wherein the anode of the second rectifier is connected to a ground via a resistor.

3. The DC-DC converter of claim 1, wherein the electronic component includes a voltage source which provides a bias voltage to the DC-DC converter.

* * * * *